(12) United States Patent
Shin

(10) Patent No.: US 12,129,875 B2
(45) Date of Patent: Oct. 29, 2024

(54) FLOW PATH SWITCHING VALVE, AND CONSTRUCTION MACHINE EQUIPPED WITH SAME

(71) Applicant: Yanmar Power Technology Co., Ltd., Osaka (JP)

(72) Inventor: Soichiro Shin, Chikugo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 29 days.

(21) Appl. No.: 17/917,817

(22) PCT Filed: Mar. 8, 2021

(86) PCT No.: PCT/JP2021/008969
§ 371 (c)(1),
(2) Date: Oct. 7, 2022

(87) PCT Pub. No.: WO2021/205800
PCT Pub. Date: Oct. 14, 2021

(65) Prior Publication Data
US 2023/0134654 A1 May 4, 2023

(30) Foreign Application Priority Data
Apr. 8, 2020 (JP) ................................. 2020-070015

(51) Int. Cl.
*F15B 13/06* (2006.01)
*F16K 11/085* (2006.01)
*F16K 27/06* (2006.01)

(52) U.S. Cl.
CPC .......... *F15B 13/06* (2013.01); *F16K 11/0853* (2013.01); *F16K 27/065* (2013.01)

(58) Field of Classification Search
CPC ...................... F15B 2013/041; F15B 13/0406; F15B 13/06; F16K 11/0853
See application file for complete search history.

(56) References Cited

U.S. PATENT DOCUMENTS

| 1,725,337 A | * | 8/1929 | Burkhard | ............ | F16K 11/0833 |
| | | | | | 137/240 |
| 6,601,610 B1 | * | 8/2003 | Mitomo | ................ | B65G 53/56 |
| | | | | | 137/874 |

(Continued)

FOREIGN PATENT DOCUMENTS

| FR | 1293433 A | 5/1962 |
| JP | 8-004920 A | 1/1996 |

(Continued)

OTHER PUBLICATIONS

International Search Report dated May 25, 2021 issued in corresponding PCT Application PCT/JP2021/008969 cites the patent documents above.

*Primary Examiner* — Abiy Teka
(74) *Attorney, Agent, or Firm* — NORTON ROSE FULBRIGHT US LLP

(57) ABSTRACT

A flow path switching valve includes a block-shaped body having a first opening and a second opening which communicate with each other via a linear first oil path, and a third opening which communicates with the first oil path via a linear second oil path; a valve body which is provided so as to be rotatable relative to the body, and in which a communication flow path is formed that allows two openings to communicate with each other depending on the rotation position; and a locking protrusion which regulates the rotation range of the valve body in order to select the rotation position of the valve body to be a predetermined rotation position where two openings of a predetermined combination among the three openings communicate with each other via the communication flow path of the valve body.

13 Claims, 17 Drawing Sheets

(56) References Cited

U.S. PATENT DOCUMENTS

| | | | | |
|---|---|---|---|---|
| 7,255,129 B2* | 8/2007 | Lopez | ............... | F16K 11/076 |
| | | | | 137/625.46 |
| 7,886,769 B2* | 2/2011 | Muller | ............ | F16K 11/0853 |
| | | | | 137/874 |
| 2013/0263952 A1* | 10/2013 | Arai | ............... | F16K 11/0853 |
| | | | | 137/625.28 |

FOREIGN PATENT DOCUMENTS

| | | |
|---|---|---|
| JP | 2013-217424 A | 10/2013 |
| JP | 2015-140810 A | 8/2015 |

\* cited by examiner

FLOW PATH SWITCHING VALVE, AND CONSTRUCTION MACHINE EQUIPPED WITH SAME

CROSS-REFERENCE TO RELATED APPLICATIONS

This application is a national stage application pursuant to 35 U.S.C. § 371 of International Application No. PCT/JP2021/008969, filed on Mar. 8, 2021, which claims priority under 35 U.S.C. § 119 to Japanese Patent Application No. 2020-070015 filed on Apr. 8, 2022, the disclosures of which are hereby incorporated by reference in their entireties.

TECHNICAL FIELD

The present invention relates to a flow path switching valve preferably used in an oil path configuration of a hydraulic oil for operating a work attachment of a construction machine and also relates to the construction machine equipped with the flow path switching valve.

BACKGROUND ART

Conventionally, for example, among excavating work machines as one type of construction machines, there is one that has a configuration where a work attachment is detachably installed on an arm that constitutes an excavating unit as a front work unit. As attachments, a bucket for the excavating work and a crushing unit (breakers) for crushing work are attached depending on the nature of work.

In this configuration where the attachment is detachably installed on the arm, there is one that is equipped with a switching valve in an oil path which is a flow path of a hydraulic oil to operate the attachment. Patent Literature 1 discloses a configuration where a so-called stop valve that opens and closes a flow path is installed, as a switching valve, on the side of an arm. In this configuration, when replacing the attachment, the stop valve closes the oil path to the attachment, and after the attachment is removed and another attachment is installed, opening the stop valve again opens the oil path.

Regarding the switching valve installed on the front work unit in this way, a configuration equipped with a so-called three-way valve, which is a flow path switching valve that has three opening portions (ports) to receive connections of oil pipes such as hydraulic hoses and selectively communicates two opening portions with each other, is known (see, for example, Patent Literature 2). The above flow path switching valves are installed on the respective oil paths for supplying and discharging the hydraulic oil to the attachment, and are placed, for example, on both the right and left sides of the arm.

In a configuration with a thumb (also referred to as a bucket fork, etc.) used together with a bucket, as disclosed in Patent Literature 2, the three-way valve simplifies the work of replacing the attachment. Specifically, as described as follows.

That is, in the case of a switching valve having only two opening portions, when the attachment is to be replaced from the bucket to the crushing unit, it is necessary to remove the oil pipe from a hydraulic cylinder used to operate the thumb and to connect the oil pipe to the crushing unit. In contrast, according to the three-way valve, the oil pipe connected to one opening portion is left connected to the hydraulic cylinder that operates the thumb, while the other one opening portion is used as an opening portion to connect the oil pipe to operate the crushing unit.

In order to securely switch the flow path in the flow path switching valve, Patent Literature 2 discloses the following technology concerning three opening portions formed in a block-shaped body and three oil paths communicated to respective opening portions. That is, the other two oil paths are formed at an angle of 120° respectively to the one oil path, and these two oil paths are formed in the shape of an arc. The opening portions through which the two arc-shaped oil paths are communicated have respective axial centers parallel to each other and open on a common face.

CITATION LIST

Patent Literature

Patent Literature 1: Japanese Unexamined Patent Application Publication No. 2015-140810
Patent Literature 2: Japanese Unexamined Patent Application Publication No. 2013-217424

DISCLOSURE OF INVENTION

Problems to be Solved by the Invention

According to the conventional three-way valve configuration described above, it is necessary to form the oil path, which is communicated to each of the opening portions, in a curved or bent shape. This makes it difficult to form the flow path to the body, causing a problem of increasing the cost for forming the flow path. In addition, two of the three opening portions are configured to open on the common face in the body, thus making it difficult to make the body compact.

The present invention has been made in view of the above problem, and therefore, it is an object of the present invention to provide a flow path switching valve that facilitates the formation of a flow path to the body, can be manufactured at a low cost, and is able to be made compact, and to provide a construction machine equipped with the flow path switching valve.

Means for Solving the Problems

A flow path switching valve according to the present invention is a flow path switching valve for switching a flow path, including: a block-shaped body having a first opening portion and a second opening portion which open on faces which are opposite to each other and communicate with each other via a linear first oil path, and a third opening portion opening which opens on a face different from the faces which are opposite to each other and communicates via a linear second oil path to the first oil path; a valve body that is rotatably installed on the body, and that is formed with a communicating flow path which communicates, depending on a rotation position, two of the three opening portions including the first opening portion, the second opening portion, and the third opening portion with each other; and a selecting portion that, by regulating a rotation range of the valve body, selects the rotation position of the valve body as any of a rotation position where the opening portions of a first combination of combinations of the two opening portions selected from the three opening portions communicate with each other by the communicating flow path, and a rotation position where the opening portions of a second combination that is the combination different from the first combination communicate with each other by the communicating flow path.

In the flow path switching valve according to another mode of the present invention, the selecting portion is equipped by mounting a rotation regulating member, which is a member detachably attached to the body, on the body, and the body has, as mounting portions of the rotation regulating member, a first mounting portion that causes the first combination to include the first opening portion and the second opening portion, and causes the second combination to include the first opening portion and the third opening portion, and a second combination that causes the first combination to include the first opening portion and the second opening portion, and causes the second combination to include the second opening portion and the third opening portion.

In the flow path switching valve according to still other mode of the present invention, the valve body has a valve body protruding portion which is a portion protruding from the body, and the valve body protruding portion is formed with a hole portion passing through in a direction along a plane perpendicular to a rotation axis direction of the valve body.

A construction machine according to the present invention is a construction machine equipped with the flow path switching valve, including: a traveling unit; a front work unit that is installed in front of the traveling unit and that includes an arm portion by which a work attachment is detachably supported; and a hydraulic driving unit that is provided on the arm portion and operates by receiving a supply of a hydraulic oil, wherein the construction machine, as the flow path switching valves, includes: a first flow path switching valve which is mounted to one of right and left sides of the arm portion, and which receives a connection of a supply oil pipe that is extended, to the first opening portion, from the traveling unit side, and that is for supplying the hydraulic oil to the hydraulic driving unit or to the attachment, and a second flow path switching valve which is mounted to another of right and left sides of the arm portion, and which receives a connection of a discharge oil pipe that is extended, to the second opening portion, from the traveling unit side, and that is for returning the hydraulic oil discharged from the hydraulic driving unit or from the attachment.

Effect of the Invention

According to the present invention, a flow path switching valve facilitates the formation of a flow path to the body, can be manufactured at a low cost, and is able to be made compact.

BRIEF DESCRIPTION OF THE DRAWINGS

FIG. 15A shows a state of the valve body in a second rotation position, and FIG. 15B shows a state of the valve body in a third rotation position.

FIG. 16A shows a breaker in use, and FIG. 16B shows a bucket in use.

FIG. 17A shows the breaker in use, and FIG. 17B shows the bucket in use.

DESCRIPTION OF EMBODIMENTS

The present invention, in a flow path switching valve used in an oil path configuration of a hydraulic oil (pressure oil) to operate a work attachment of a construction machine, for example, seeks to reduce costs and make the unit more compact by devising a flow path configuration formed by a body and a valve body installed on the body. A description will hereinafter be made on an embodiment of the present invention with reference to the drawings.

In the present embodiment, a description will be made on an excavating work machine t, which is a turning work vehicle, as an example of a construction machine according to the present invention. However, the construction machine according to the present invention is not limited to the excavating work machine, but can be widely applied to any other construction machine, such as a crane work machine and a wheel loader, for example.

Figure 1:
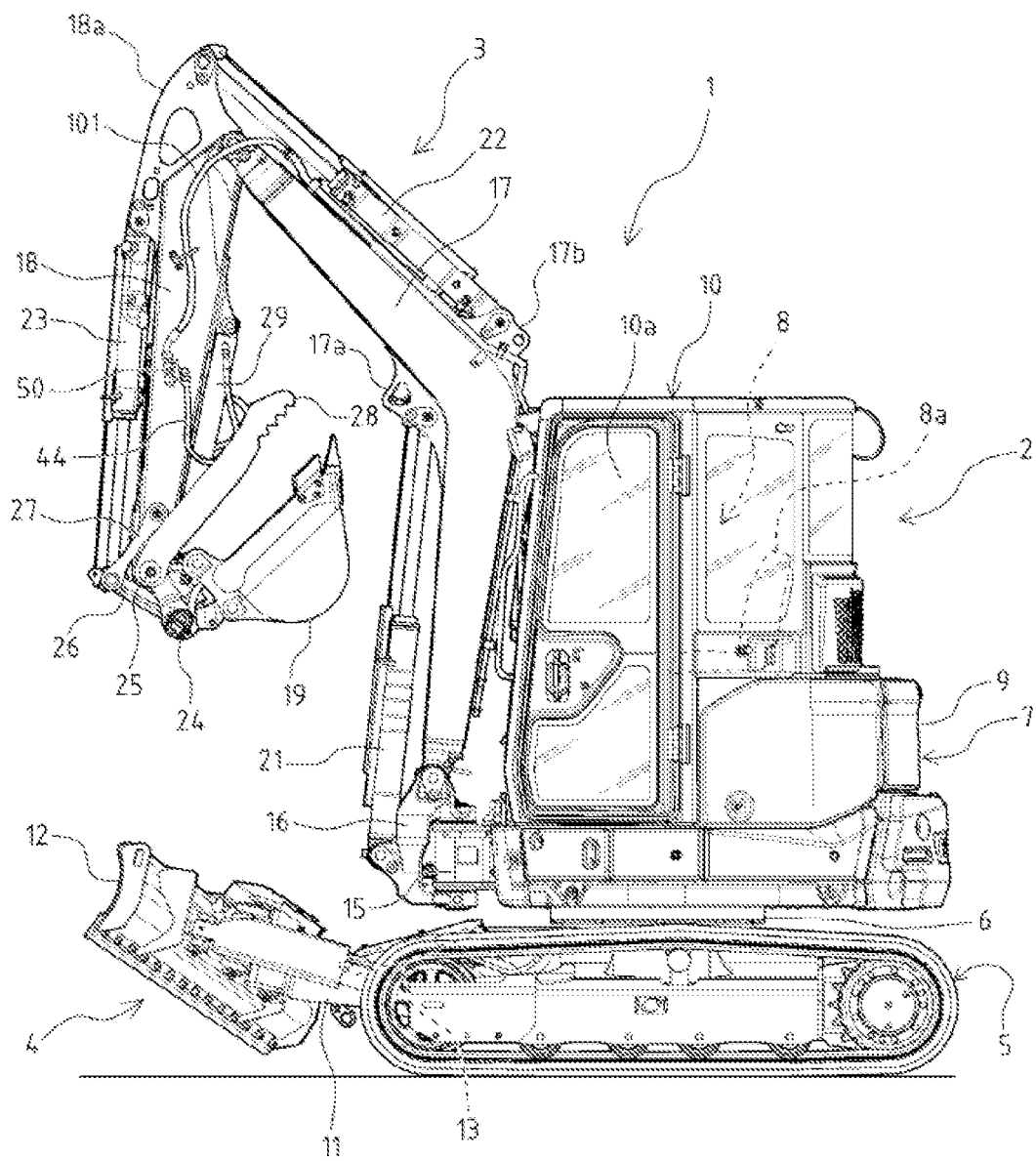
FIG. 1 is a left side view of a construction machine according to one embodiment of the present invention.
Figure 2:
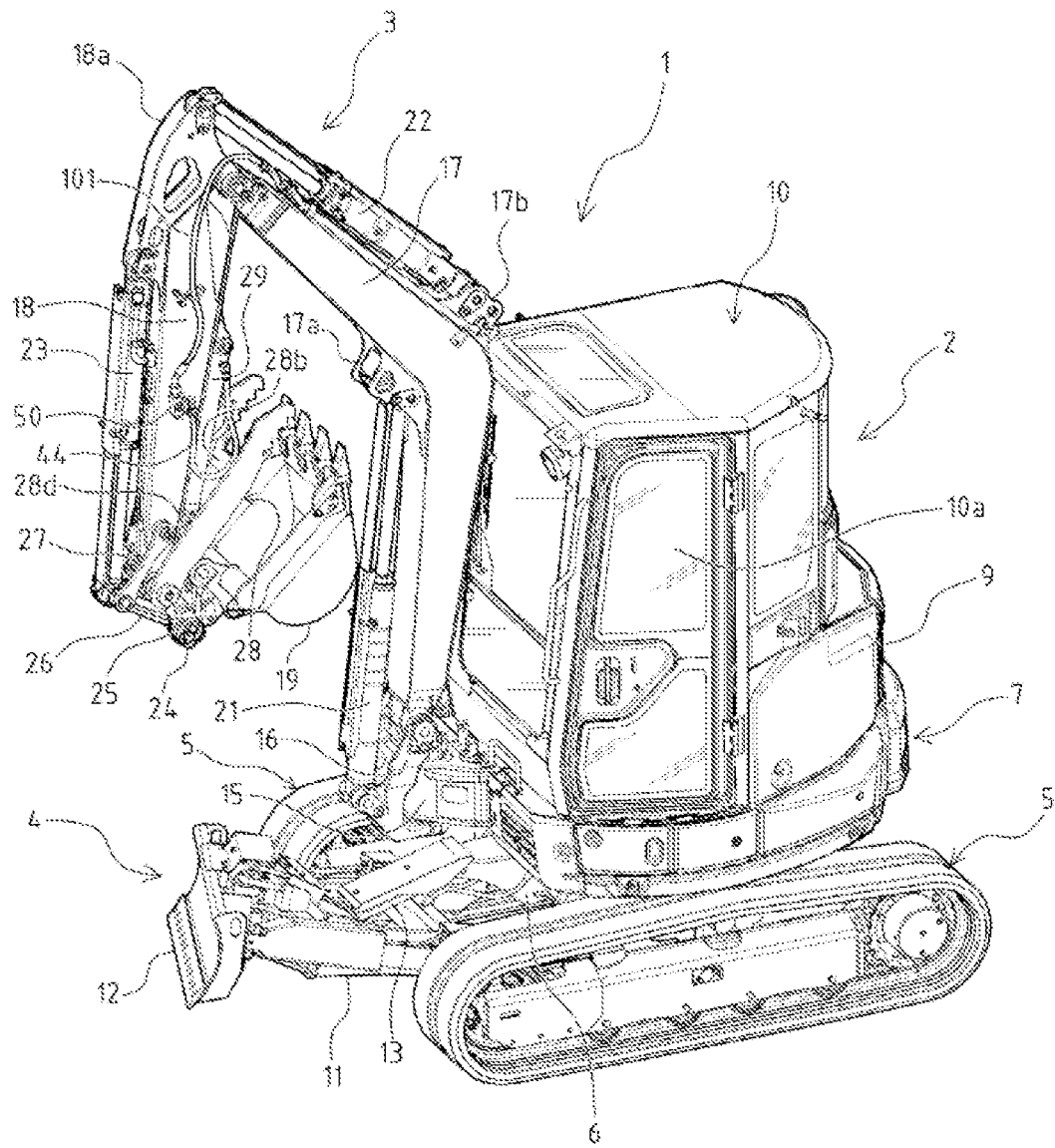
FIG. 2 is a perspective view of the construction machine, viewed from a left side, according to the one embodiment of the present invention.
Figure 3:
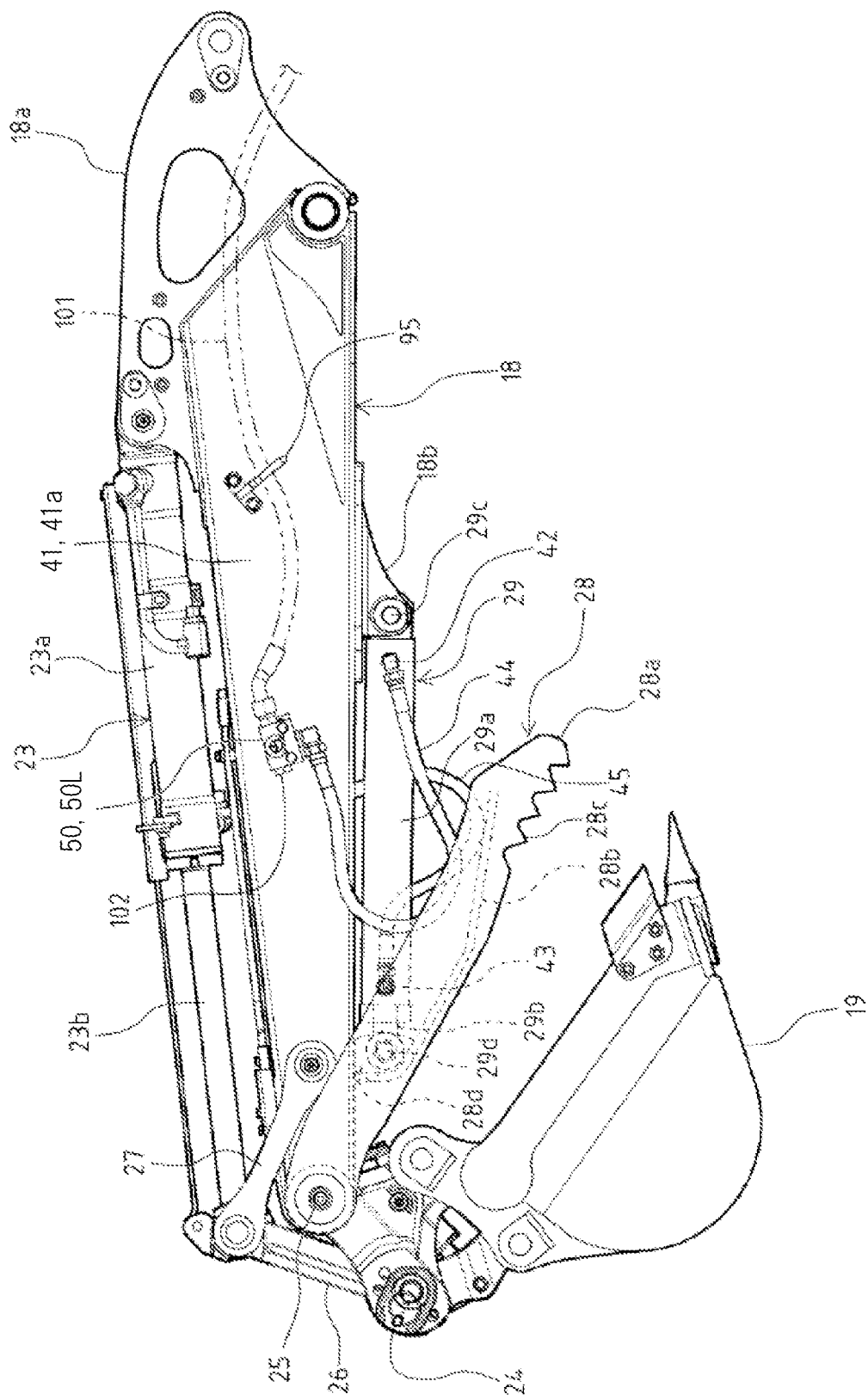
FIG. 3 is a left side view of a part of an excavating unit according to the one embodiment of the present invention.

A description will be made on an overall configuration of an excavating work machine 1 according to the present embodiment with reference to FIG. 1 and FIG. 2. As shown in FIGS. 1 and 2, the excavating work machine 1 includes a traveling unit 2 as a self-propelled traveling body, and an excavating unit 3 and a soil removal unit 4, each of which is a work portion mounted to the traveling unit 2.

The traveling unit 2 is a part constituting a main machine of the excavating work machine 1 and has a pair of crawler-type traveling portions 5, 5 on right and left, a machine body frame 6 as a base stand installed between the right and left traveling portions 5, 5, and a turn stand 7 installed on the machine body frame 6. The turn stand 7 is configured in a substantially circular shape in plan view, and can turn in any of right and left directions around a vertical axis.

On the turn stand 7, there is installed a driving portion 8. In the latter half portion on the turn stand 7, there is installed a prime mover portion 9 that includes an engine and the like.

The driving portion 8 is for driving and operating the traveling unit 2, the excavating unit 3, and the soil removal unit 4, and is installed on a cabin 10 installed for the turn stand 7. The cabin 10 has a frame that forms an outline thereof and a plurality of window portions made of glass or other transparent member, and is configured as a whole in a substantially box shape. In the left side portion, the cabin 10 has an open/close door 10a that opens and closes an operator's entrance to and exit from the driving portion 8.

In the driving portion 8, a driver's seat support stand is installed on a floor portion, and a driver's seat 8a is installed on the driver's seat support stand. In the driving portion 8, a pair of right and left traveling levers is installed in front of the driver's seat 8a, extending upward from the floor portion, and a plurality of work operation pedals is placed on both right and left sides of the traveling levers on the floor portion. In the driving portion 8, the driver's seat 8a is surrounded by work operation levers for operating the work portion (excavating unit 3 or soil removal unit 4) and an operation panel portion having various actuator portions, such as switches, etc.

A base end portion of the excavating unit 3 is mounted to the right/left center portion of the front end of the turn stand 7. The soil removal unit 4 is mounted to the front side of the machine body frame 6 via between the right and left traveling portions 5, 5.

The soil removal unit 4 has a support frame 11 that includes a pair of right and left arms, each of which extends in a front-rear direction, at a position between the right and left traveling portions 5, 5, a blade 12 as a soil removal plate that is installed on a tip side of the support frame 11, and a blade cylinder 13 that lifts/lowers the blade 12 via the support frame 11.

In a manner to be rotatably lifted and lowered, the support frame 11 is mounted to the machine body frame 6 by having the right and left arms rotatably supported to a support bracket installed on the front portion of the machine body frame 6 with the right/left direction as a rotation axis direction. The blade 12 is installed in a manner to be supported to the front end portion of the support frame 11. The blade 12 extends in the right/left direction in a manner to have a width that is substantially the same as the right/left width of the right and left traveling portions 5. The blade cylinder 13 is equipped in a state of being bridged between the machine body frame 6 and the support frame 11.

In the excavating work machine 1 that has the configuration as described above, a desired operation or work is performed when an operator who is seated on the driver's seat 8a appropriately operates the traveling lever, the work operation lever, or the like. Specifically, by the operating of the traveling lever, for example, the traveling unit 2 makes the forward/rearward linear travel or right/left turn travel. In addition, operating the work operation lever performs the excavating work by the excavating unit 3, or the soil removal work or leveling work by the soil removal unit 4.

FIGS. 1 through 4 are to be used to describe the excavating unit 3. The excavating unit 3 is a front work unit that is installed on a front side of the traveling unit 2. Specifically, a support bracket 15 is protruded forward at the right and left center portion of the front end of the turn stand 7, the base end portion of the excavating unit 3 is mounted to the support bracket 15. The excavating unit 3 has a boom support bracket 16 as a member of the base end portion thereof. The excavating unit 3 has the boom support bracket 16 rotatably supported to the support bracket 15 on the main machine side with the vertical direction as a rotation axis direction.

The excavating unit 3 is so installed as to swing right and left with respect to the turn stand 7 by means of a swing cylinder (not shown) placed on the right side of the boom support bracket 16. The swing cylinder is placed between the boom support bracket 16 and the turn stand 7.

The excavating unit 3 has a boom 17 that constitutes the base end portion thereof, an arm 18 that is coupled to a tip side of the boom 17, and a bucket 19 that is mounted to a tip portion of the arm 18. The excavating unit 3 also has a boom cylinder 21 that causes the boom 17 to be rotationally operated, an arm cylinder 22 that causes the arm 18 to be rotationally operated, and a work tool cylinder 23 that causes the bucket 19 to be rotationally operated.

The boom 17 has a boomerang-shaped bent shape in side view, and is rotatably supported to the boom support bracket 16 with the right/left direction as a rotation axis direction. The boom cylinder 21 is placed on the front side of the erect boom 17, and is bridged between the boom support bracket 16 and a bracket 17a protruding on the inside of a bent portion of the boom 17.

The arm 18 is rotatably connected to the tip portion of the boom 17 with the right/left direction as the rotation axis direction. The arm cylinder 22 is placed on the upper side (back side) of the erect boom 17, and is bridged between a bracket 17b protruding on the outside of the bent portion of the boom 17 and an end portion on a rear side (upper side) of a bracket 18a protruding on the rear end portion of the arm 18.

The bucket 19 is connected to the tip portion of the arm 18 via an attachment bracket 24. The attachment bracket 24 is a fitting member of the work attachment, and is installed by means of an axle portion 25 to the tip portion of the arm 18 in a manner to be rotated with the left/right direction as the rotation axis direction. The work tool cylinder 23 is placed on the front side (back side) of the arm 18 which hanging down from the upper end of the boom 17.

The work tool cylinder 23 has a cylinder 23a, and a cylinder rod 23b that has a piston on one end side and is slidably installed in the cylinder 23a via the piston. The work tool cylinder 23's end portion on the bottom side (cylinder 23a side) as an end portion on one side is supported to an end portion on the front side (lower side) of the bracket 18a in a rotatable manner with the right/left direction as the rotation axis direction.

Meanwhile, the work tool cylinder 23's end portion on the rod side (cylinder rod 23b side) as an end portion on the other side is connected to the attachment bracket 24 via a first link 26. Via a second link 27, the work tool cylinder 23's end portion on the rod side is supported to a site near the tip portion of the arm 18.

The first link 26 is rotatably connected to the work tool cylinder 23 and the attachment bracket 24 respectively, with the left/right direction as the rotation axis direction. The second link 27 is rotatably communicated to the work tool cylinder 23 and the arm 18 respectively, with the left/right direction as the rotational axis. A portion to support the second link 27 to the arm 18 is positioned more on the base end side of the arm 18 than the axle portion 25.

In this configuration, the extending and contracting of the work tool cylinder 23 causes the attachment bracket 24 to rotate with the axle portion 25 as the rotation axis, the bucket 19 rotates in unison with the attachment bracket 24.

The excavating unit 3 is equipped with a thumb 28 used together with the bucket 19. The thumb 28 is also called a bucket fork, etc., and is so installed as to face the open side of the bucket 19 in a state of being rotatably supported by the arm 18. With the thumb 28, in addition to the excavating work by the bucket 19, it is possible to sandwich logs, rocks, etc. between the bucket 19 and the thumb 28 and convey the same, making it possible to expand applications of the bucket 19.

The thumb 28 has a pair of right and left claw portions 28a and a support plate portion 28b linking the right and left claw portions 28a. The claw portion 28a is a longitudinal plate-like portion with the right/left direction as a plate thickness direction. A serrated concave/convex portion 28c is formed on the bucket 19 side of the tip portion of the claw portion 28a. The support plate portion 28b is a plate-like portion installed in the mode of being bridged between the right and left claw portions 28a, and is installed between the middle portions of the right and left claw portions 28a in the longitudinal direction.

The thumb 28 is configured as an integrated member including the right and left claw portions 28a and the support plate portion 28b. The thumb 28's base end portion, which is on the opposite side of the right and left claw portions 28a's concave/convex portion 28c side, is supported to the tip portion of the arm 18 in a manner to rotate at the axle portion 25 with the right/left direction as the axis direction.

The thumb 28 is rotated around the axle portion 25 by a thumb cylinder 29 of the excavating unit 3. The thumb cylinder 29 is placed at the rear side (ventral side) of the arm 18 hanging down from the upper end of the boom 17, i.e., on the side opposite to the work tool cylinder 23 with respect to the arm 18.

The thumb cylinder 29 has a cylinder 29a, and a cylinder rod 29b that has a piston on one end side and is slidably installed in the cylinder 29a via the piston. The inner space of the cylinder 29a is divided by the piston into a bottom-side chamber which is a space on the cylinder 29a side (bottom side), and a rod-side chamber which is a space on the cylinder rod 29b side (rod side). Supplying and discharging of the hydraulic oil to and from the bottom-side chamber and rod-side chamber, respectively, moves the cylinder rod 29b relative to the cylinder 29a, extending and contracting the thumb cylinder 29.

The thumb cylinder 29's end portion on the bottom side as an end portion on one side is supported to a support bracket 18b, which is protruding on the rear side of the arm 18, in a manner to be rotated by a bottom-side axial support portion 29c with the right/left direction as the rotation axis direction. Meanwhile, the thumb cylinder 29's end portion on the rod side as an end portion on the other side is supported to a cylinder support portion 28d, which is protruding on the inside of the support plate portion 28b of the thumb 28, in a manner to be rotated by a rod-side axial support portion 29d with the right/left direction as the rotation axis direction. The extending and contracting of the thumb cylinder 29 causes the thumb 28 to rotate with the axle portion 25 as the rotation axis.

In the excavating unit 3 with the above configuration, the bucket 19 as a work attachment is detachably mounted to an arm portion, and the bucket 19 is replaced by another device such as a rock excavating device or a crushing unit depending on the nature of work. Thus, the excavating unit 3 includes the arm portion by which the work attachment is detachably supported, and the arm portion, via the attachment bracket 24 installed at the tip portion of the arm portion, receives mounting of the attachment that accords to the nature of work. In the present embodiment, the arm portion of the excavating unit 3 is the support arm portion including the boom 17 and the arm 18 which are connected and supported on the front side of the machine body frame 6 of the traveling unit 2.

In the excavating unit 3, the thumb cylinder 29 which is a hydraulic cylinder and the thumb 28 rotated by its extending and contracting, as a hydraulic driving unit that operates by receiving a supply of the hydraulic oil, are installed on the arm portion. That is, in the present embodiment, the hydraulic driving unit provided on the arm portion of the excavating unit 3 and operated by receiving a supply of the hydraulic oil is a unit configuration including the thumb cylinder 29 and the thumb 28.

Figure 5:
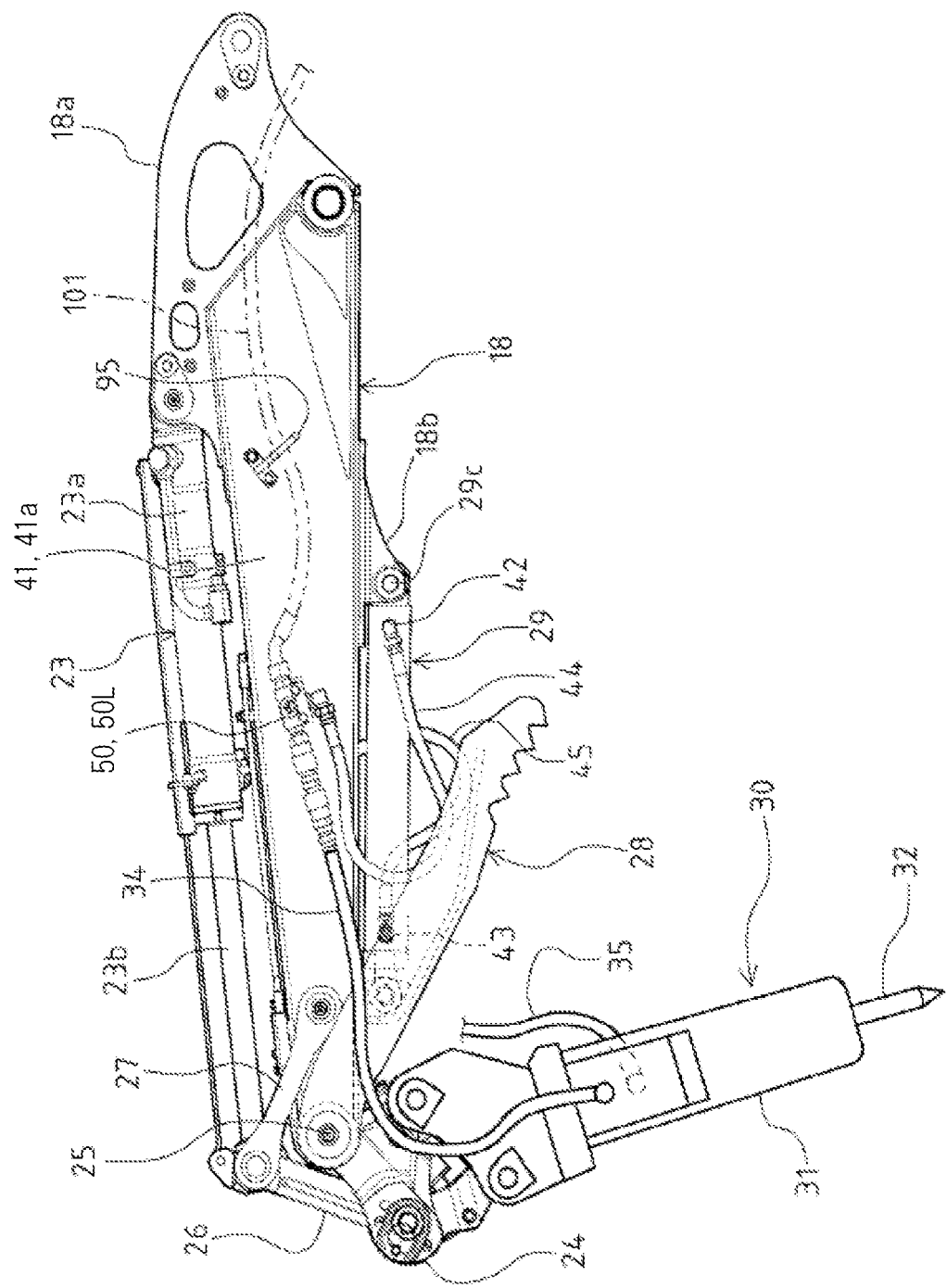
FIG. 5 is a left side view showing a crushing unit installed in place of a bucket in the excavating unit according to the one embodiment of the present invention.

FIG. 5 shows a state where, in the excavating unit 3, instead of the bucket 19, a breaker 30 which is a crushing unit is installed as the work attachment. The breaker 30 can be used with the thumb 28 installed on the arm 18. The breaker 30 has a device body portion 31 with a driving portion and the like built in a casing, and a rod portion 32 which is an action portion protruding from one side of the device body portion 31.

The breaker 30, like the bucket 19, is detachably mounted to the attachment bracket 24. By extending and contracting of the work tool cylinder 23, the breaker 30, with the axle portion 25 as the rotation shaft, rotates integrally with the attachment bracket 24 thereby to change a posture.

The breaker 30 is a so-called hydraulic breaker that has a drive source such as a hydraulic motor and operates by receiving a supply of the hydraulic oil. Receiving a supply of the hydraulic oil, the breaker 30 is operated by hydraulic pressure. The breaker 30 receives the connection of one end side of each of a supply breaker hose 34 and a discharge breaker hose 35. The supply breaker hose 34 is a supply oil pipe for supplying the hydraulic oil to the breaker 30. The discharge breaker hose 35 is a discharge oil pipe for returning the hydraulic oil, which is discharged from the breaker 30, to a predetermined location such as an oil tank.

In the excavating unit 3 with the above configuration, the oil path, which is the flow path of the hydraulic oil for operating the thumb cylinder 29 and the breaker 30, is equipped with a flow path switching valve 50. The flow path switching valve 50 is a so-called three-way valve that has three opening portions (ports) to receive connections of hydraulic hoses which are oil pipes, and selectively communicates the two opening portions to each other. With the flow path switching valve 50, the hydraulic hose connected to the one opening portion is left connected to the thumb cylinder 29, while the other one opening is used to connect the hydraulic hose to operate the breaker 30.

For the breaker 30, the flow path switching valves 50 are installed on the respective oil paths for supplying and discharging the hydraulic oil. In the present embodiment, the flow path switching valves 50 are installed for the left and right sides 41 (41a, 41b) of the arm 18. That is, one of the flow path switching valves 50 (50L) installed on the oil path for supplying the hydraulic oil is mounted for a left side 41a of the arm 18. The other flow path switching valve 50 (50R) installed on the oil path for discharging the hydraulic oil is mounted for a right side 41b of the arm 18.

Thus, the excavating unit 3 is equipped, as the flow path switching valves 50, with a left flow path switching valve 50L which is a first flow path switching valve installed on the supply path of the hydraulic oil to the breaker 30, and a right flow path switching valve 50R which is a second flow path switching valve installed on the discharge path of the hydraulic oil from the breaker 30. The left flow path switching valve 50L and the right flow path switching valve 50R have a configuration common to each other.

A bottom-side hydraulic hose 44, one end of which is connected to a bottom-side port 42 of the thumb cylinder 29, extends from the left flow path switching valve 50L. A rod-side hydraulic hose 45, one end of which is connected to a rod-side port 43 of the thumb cylinder 29, extends from the right flow path switching valve 50R.

The bottom-side port 42 is a connection port that communicates to a bottom-side chamber in the cylinder 29a, and is installed on the left side in the end portion on the bottom side of the cylinder 29a. The rod-side port 43 is a connection port that communicates to a rod-side chamber in the cylinder 29a, and is installed on the right side in an end portion of the rod of the cylinder 29a.

A description will be made on a configuration of the flow path switching valve 50 with reference to FIG. 6 to FIG. 17. As shown in FIGS. 6 to 17, the flow path switching valve 50 is a flow path switching valve for switching the flow path of the hydraulic oil to the thumb cylinder 29 and breaker 30, and is equipped with a block-shaped body 51 and a valve body 52 that is rotatable relative to the body 51. The flow path switching valve 50 is symmetrical in the right/left direction.

The body 51 has a front face 51a, a rear face 51b, a right face 51c, a left face 51d, a top face 51e, and a bottom face 51f each of which is a flat face, and these faces form a rectangular outline. In the flow path switching valve 50, the side that appears in the side view of the excavating unit 3 (the bottom side in FIG. 7) is defined as the front side and the opposite side is defined as the rear side, and the longitudinal direction (right and left in FIG. 8) in the front view of the flow path switching valve 50 is defined as the right/left direction, and the short direction (up and down in FIG. 8) in the same front view is defined as the up/down direction. The body 51 defines the right/left direction as the longitudinal direction relative to the front-back and vertical directions, respectively.

The body 51 has three opening portions (ports) including a first opening portion 61, a second opening portion 62, and a third opening portion 63. Each of the opening portions of the body 51 is a circular opening part that receives the connection of a coupling for connecting the hydraulic hose. The three opening portions of the body 51 have an identical or a substantially identical hole diameter.

In the body 51, the first opening portion 61 and the second opening portion 62 are side opening portions formed in a manner to open facing the right face 51c as one side and the left face 51d as the other side, which are opposite faces to each other. In the body 51, the first opening portion 61 and the second opening portion 62 are communicated with each other via a linear first oil path 71. The first opening portion 61 and the second opening portion 62 are formed at a position closer to the upper side than the center in the vertical direction, and both opening portions are formed at the same height position relative to the bottom face 51f of the body 51.

In the body 51, the third opening portion 63 is a bottom opening portion formed in a manner to open facing the bottom face 51f which is a face different from the right face 51c and the left face 51d. In the body 51, the third opening portion 63 communicates to the first oil path 71 via a linear second oil path 72. The third opening portion 63 is formed in the center portion of the bottom face 51f of the body 51.

Figure 6:
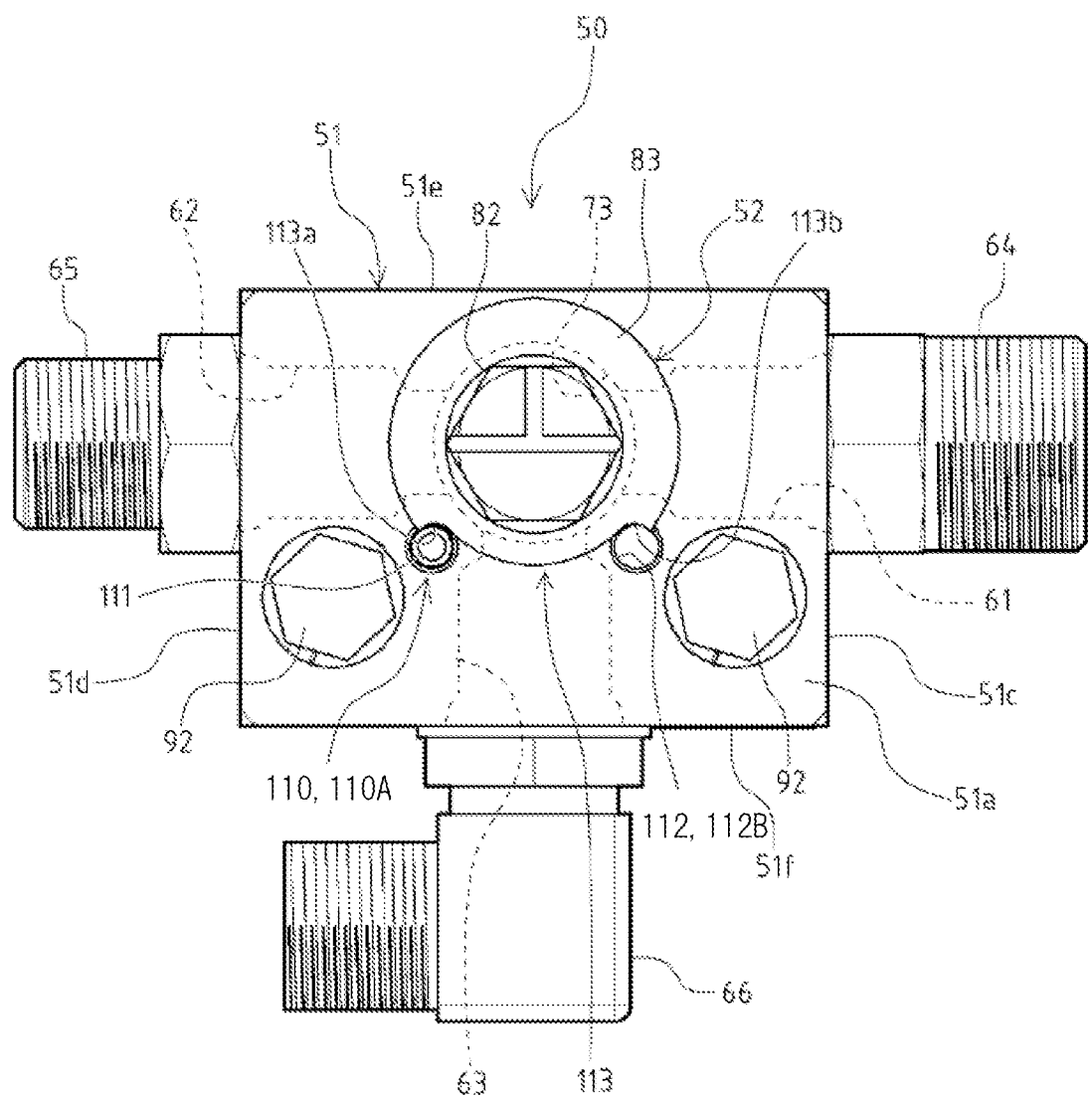
FIG. 6 is a front view showing a state of a flow path switching valve being installed according to the one embodiment of the present invention.
Figure 7:
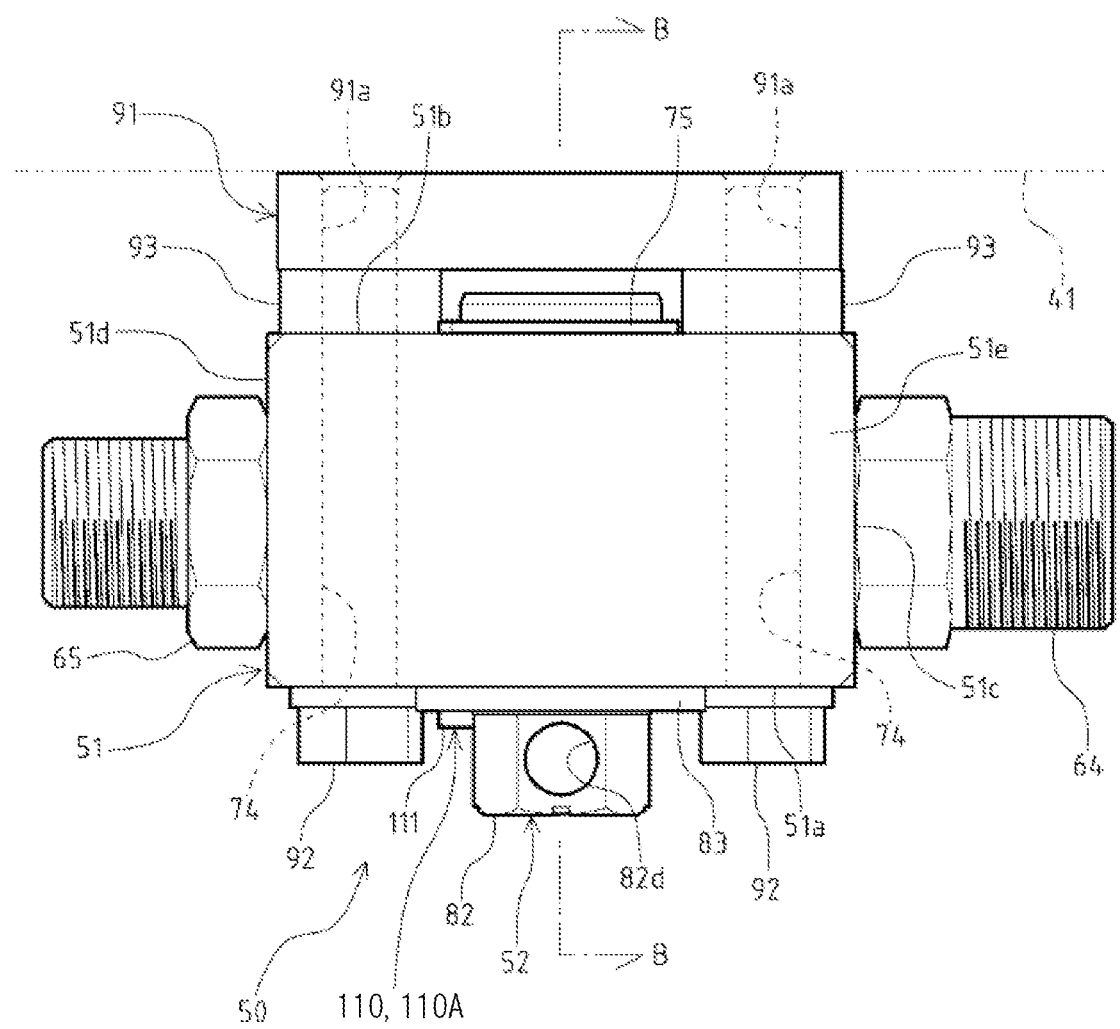
FIG. 7 is a top view of a state of the flow path switching valve being installed according to the one embodiment of the present invention.
Figure 8:
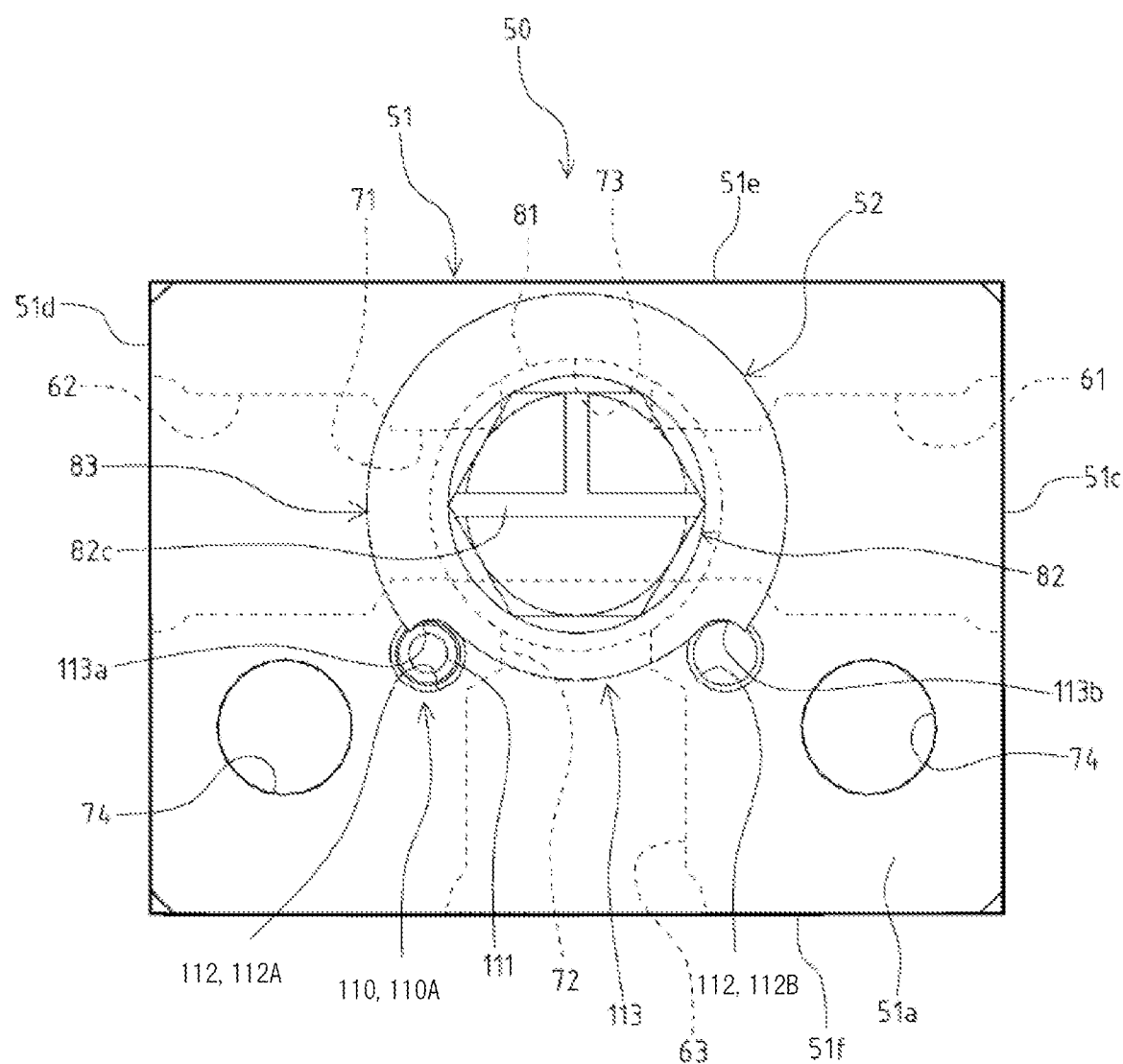
FIG. 8 is a front view showing the flow path switching valve according to the one embodiment of the present invention.
Figure 9:
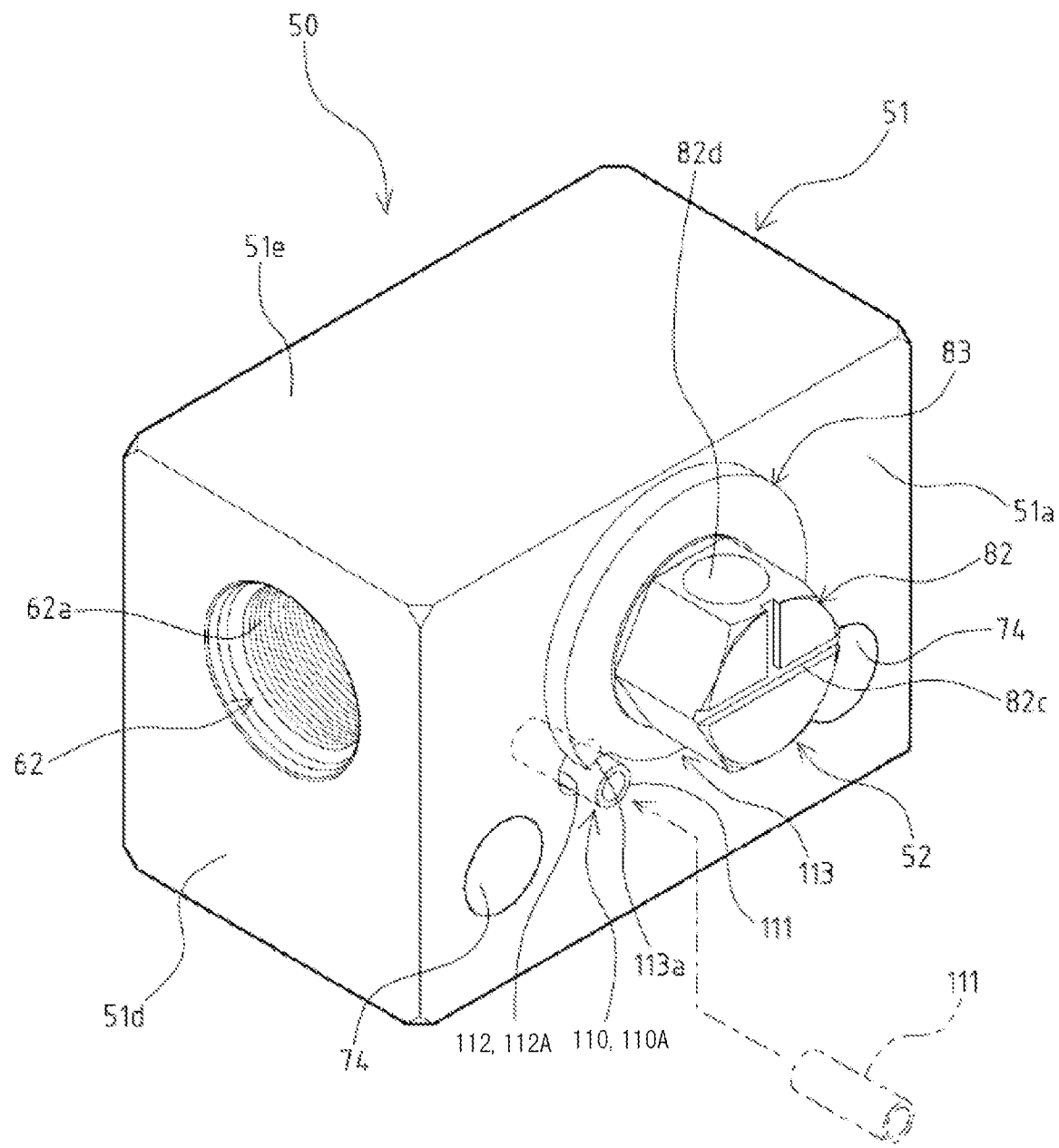
FIG. 9 is a top perspective view showing the flow path switching valve according to the one embodiment of the present invention.
Figure 10:
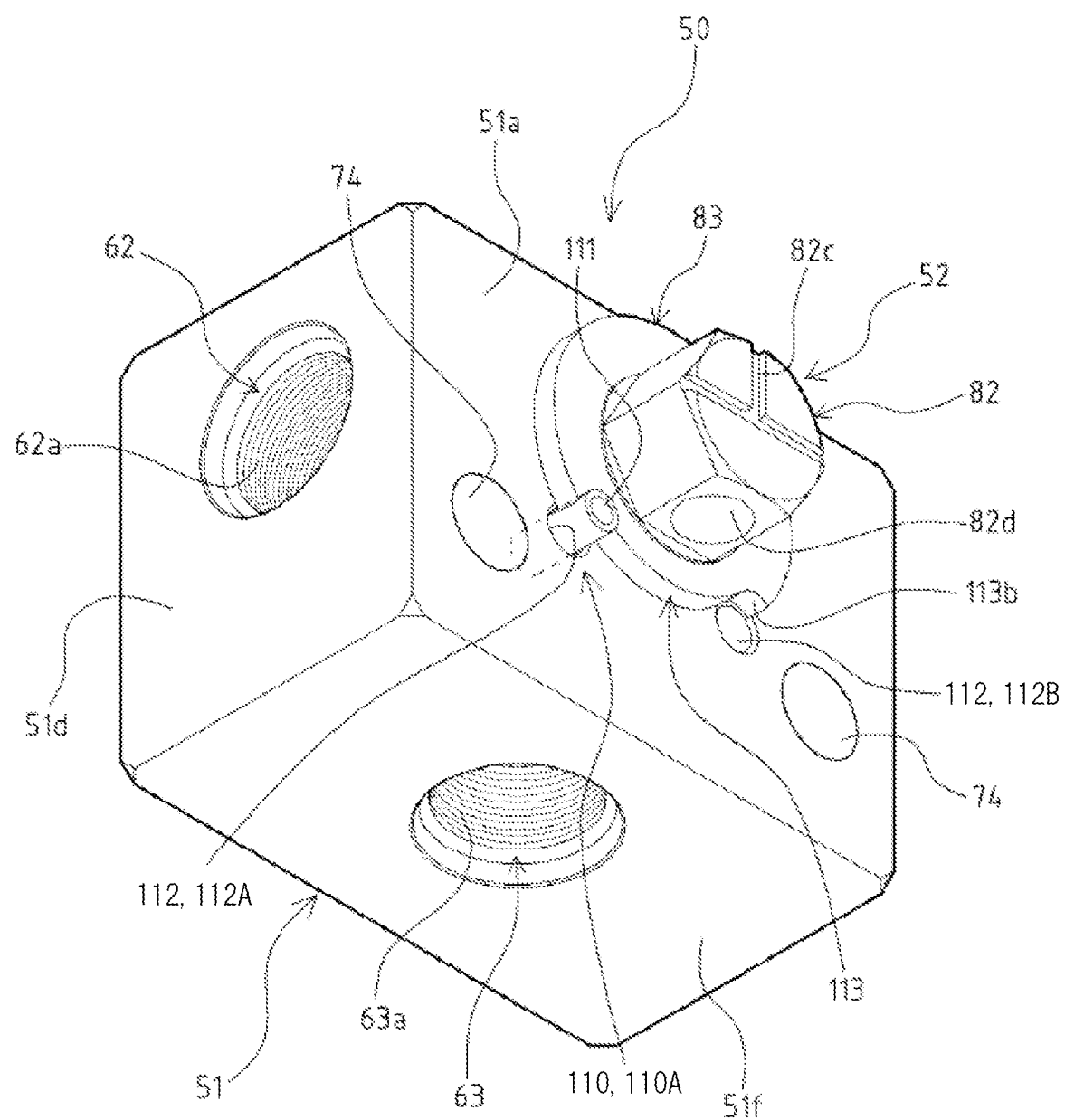
FIG. 10 is a bottom perspective view showing the flow path switching valve according to the one embodiment of the present invention.

In the examples shown in FIGS. 6 and 7, a first coupling 64 is mounted to the first opening portion 61, a second coupling 65 is mounted to the second opening portion 62, and a third coupling 66 is mounted to the third opening portion 63, respectively. Each coupling is screw-fastened to the opening portion via an oil seal or the like. Due to this, the inner peripheral faces of the respective opening portions have female thread portions 61a, 62a, 63a.

In the body 51, the first oil path 71 is formed along the right/left direction in a manner to be along the cylindrical inner peripheral face coaxial with the first opening portion 61 and the second opening portion 62. The first opening portion 61, the second opening portion 62, and the first oil path 71 form a flow path portion passing through the body 51 in the right/left direction. In the present embodiment, the first oil path 71 has a predetermined inner diameter (flow path diameter) that is reduced relative to the inner diameters (hole diameters) of the first opening portion 61 and the second opening portion 62.

In the body 51, the second oil path 72 is formed along the vertical direction in a manner to be along the cylindrical inner peripheral face coaxial with the third opening portion 63. In the body 51, the third opening portion 63 and the second oil path 72 form a flow path portion communicating from the bottom side to the first oil path 71. In the present embodiment, the second oil path 72 has a predetermined inner diameter (flow path diameter) that is reduced relative to the inner diameter (hole diameter) of the third opening portion 63 and has an identical or a substantially identical hole diameter with that of the first oil path 71.

In the body 51, the first oil path 71 and the second oil path 72 are formed along a substantially T" shape in frontal cross-sectional view. At a merging part of the first oil path 71 and the second oil path 72, a valve body support hole 73 for through-supporting the valve body 52 is formed in the front-back direction. The valve body support hole 73 is formed along the cylindrical face. In the body 51, the three opening portions (61, 62, 63) as well as the first and second oil paths 71 and 72 are formed so that their respective central axes are placed on a common plane perpendicular to the front-back direction.

Figure 13:
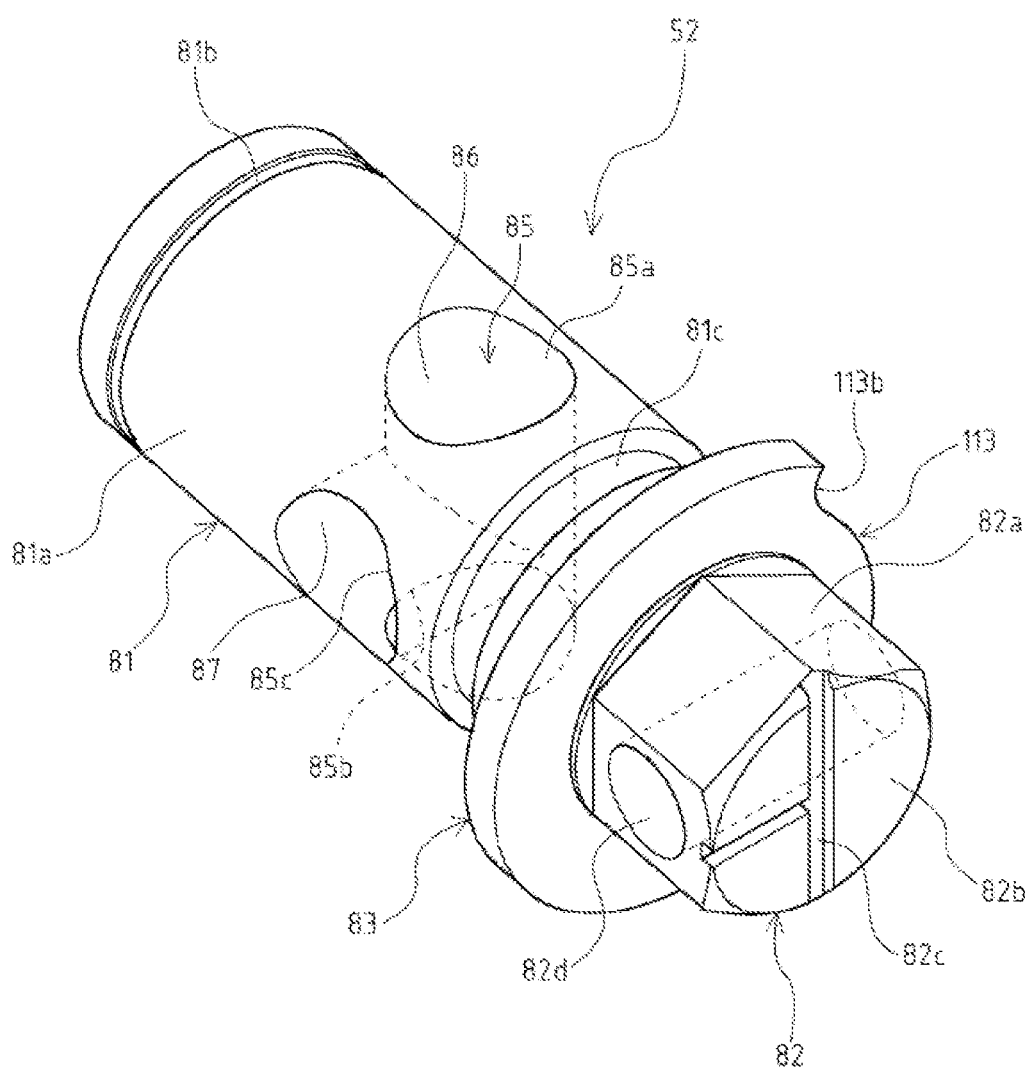
FIG. 13 is a perspective view showing a valve body according to the one embodiment of the present invention.
Figure 14:
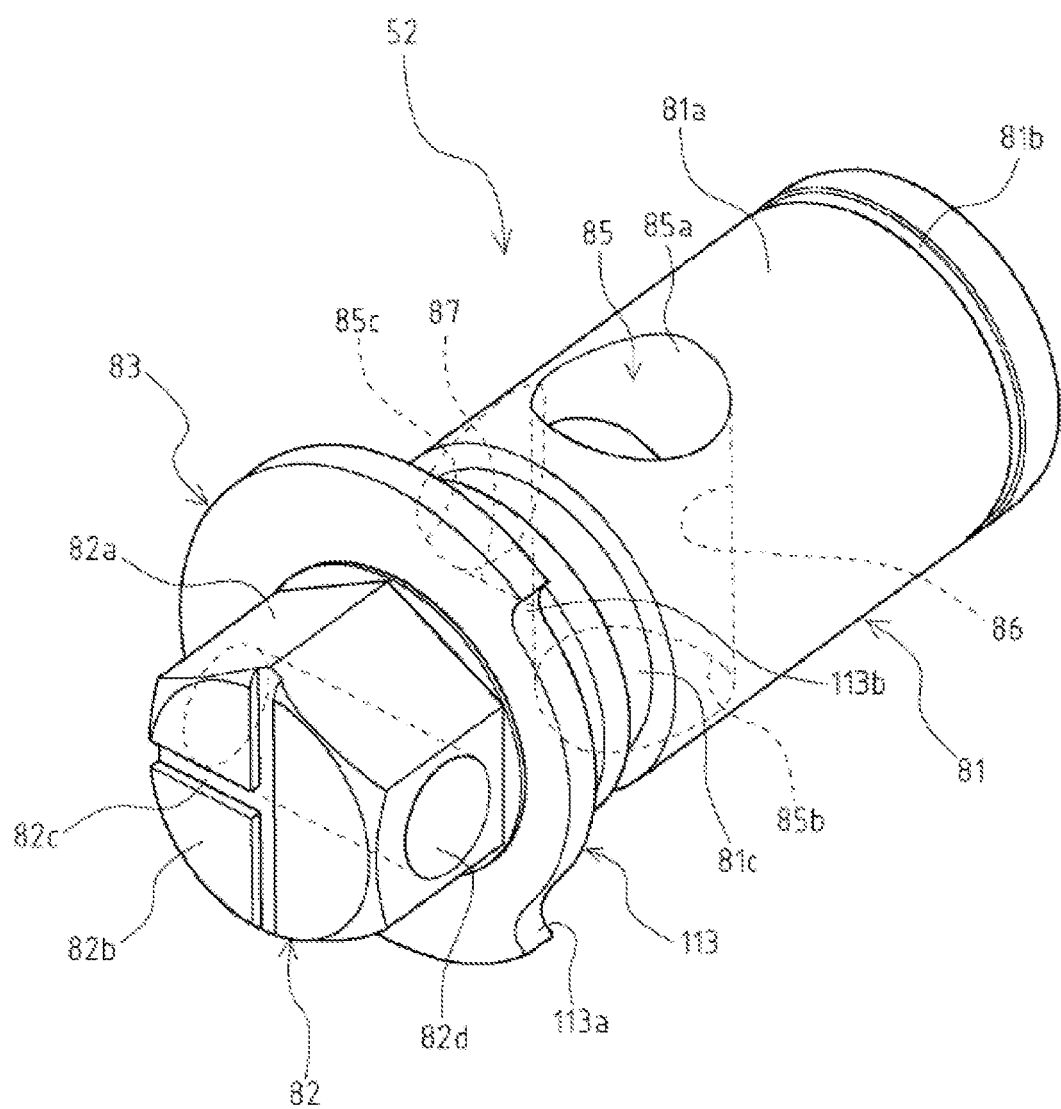
FIG. 14 is a perspective view showing the valve body according to the one embodiment of the present invention.
Figure 15:
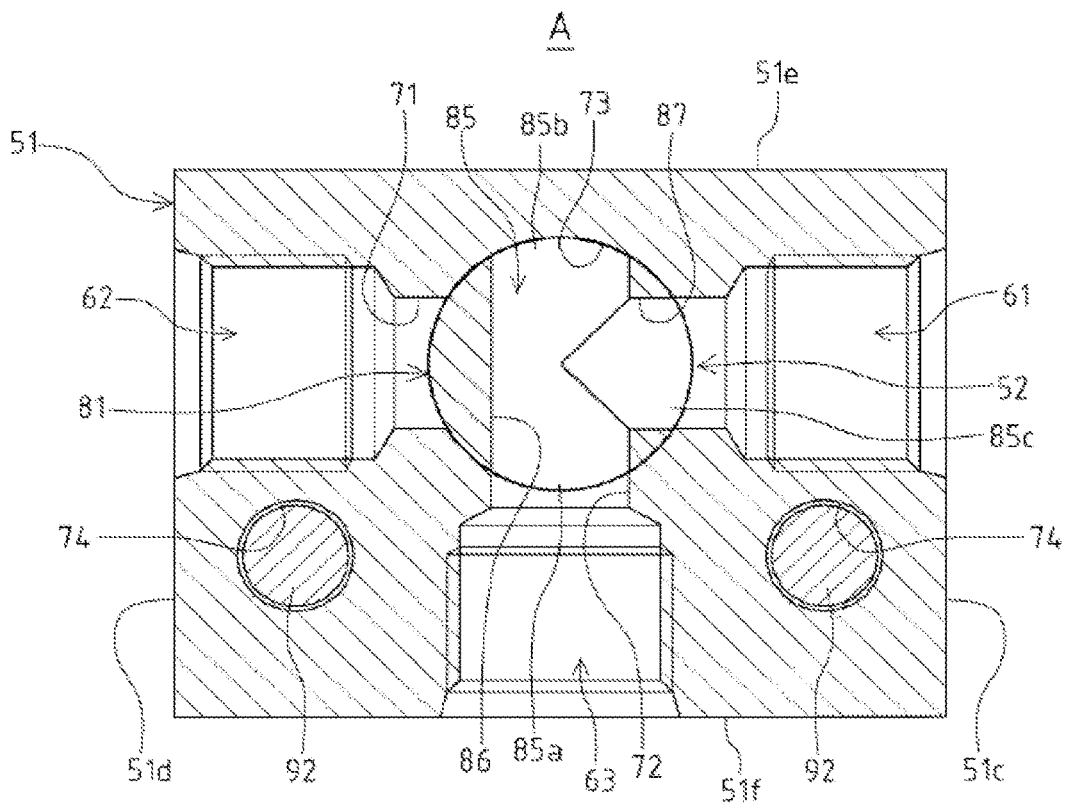
FIG. 15 shows a state of switching the flow path switching valve according to the one embodiment of the present invention.
Figure 15:
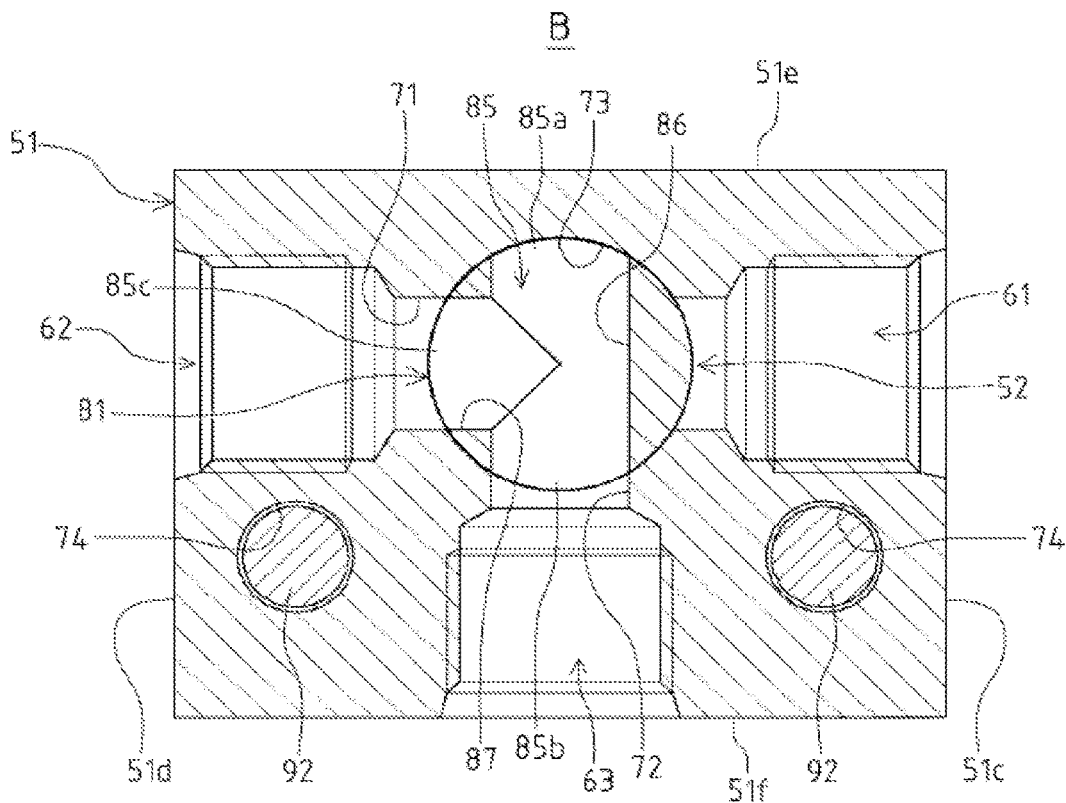
Figure 16:
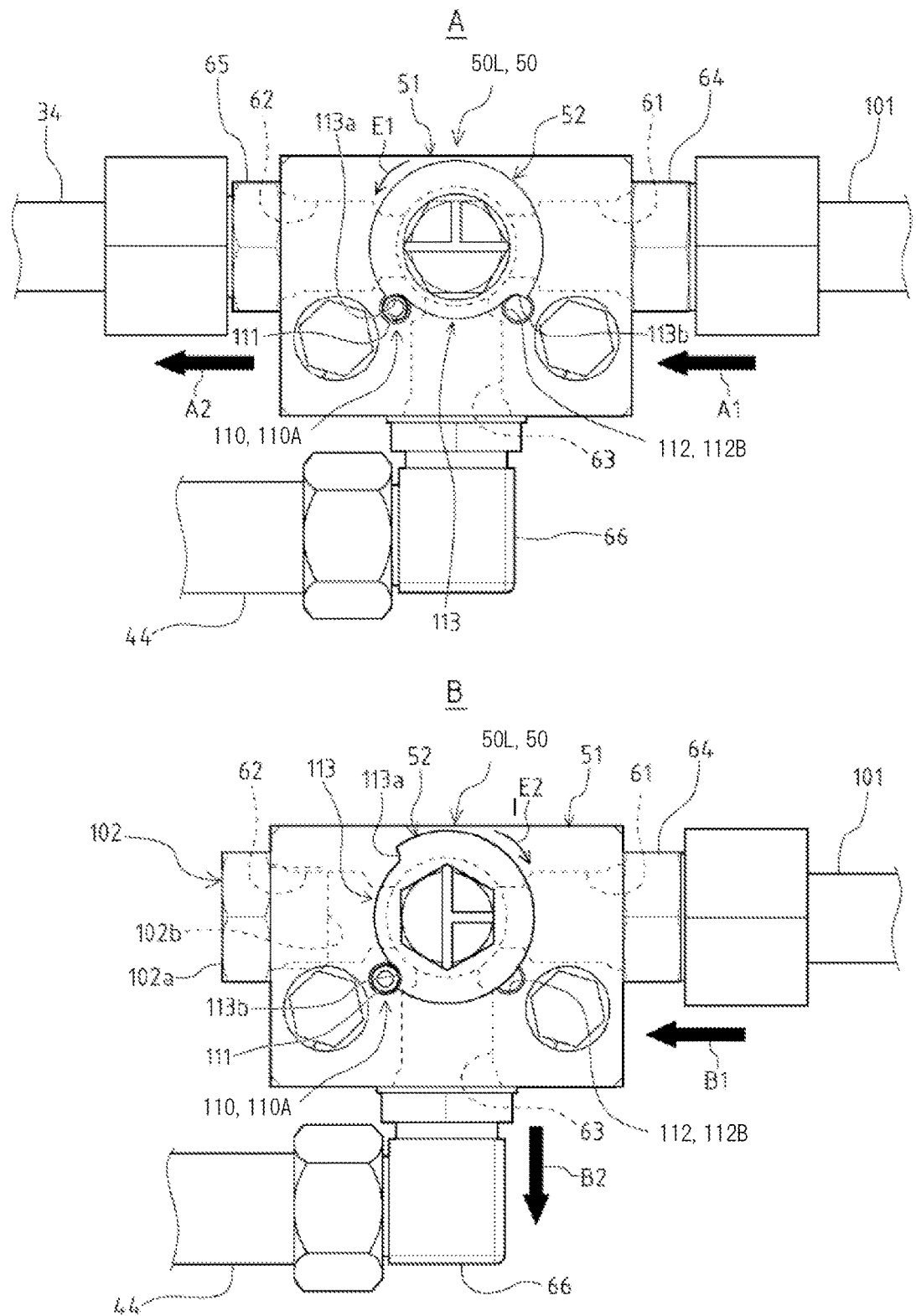
FIG. 16 shows one example of a connection mode of a hydraulic hose to a left flow path switching valve according to the one embodiment of the present invention.
Figure 17:
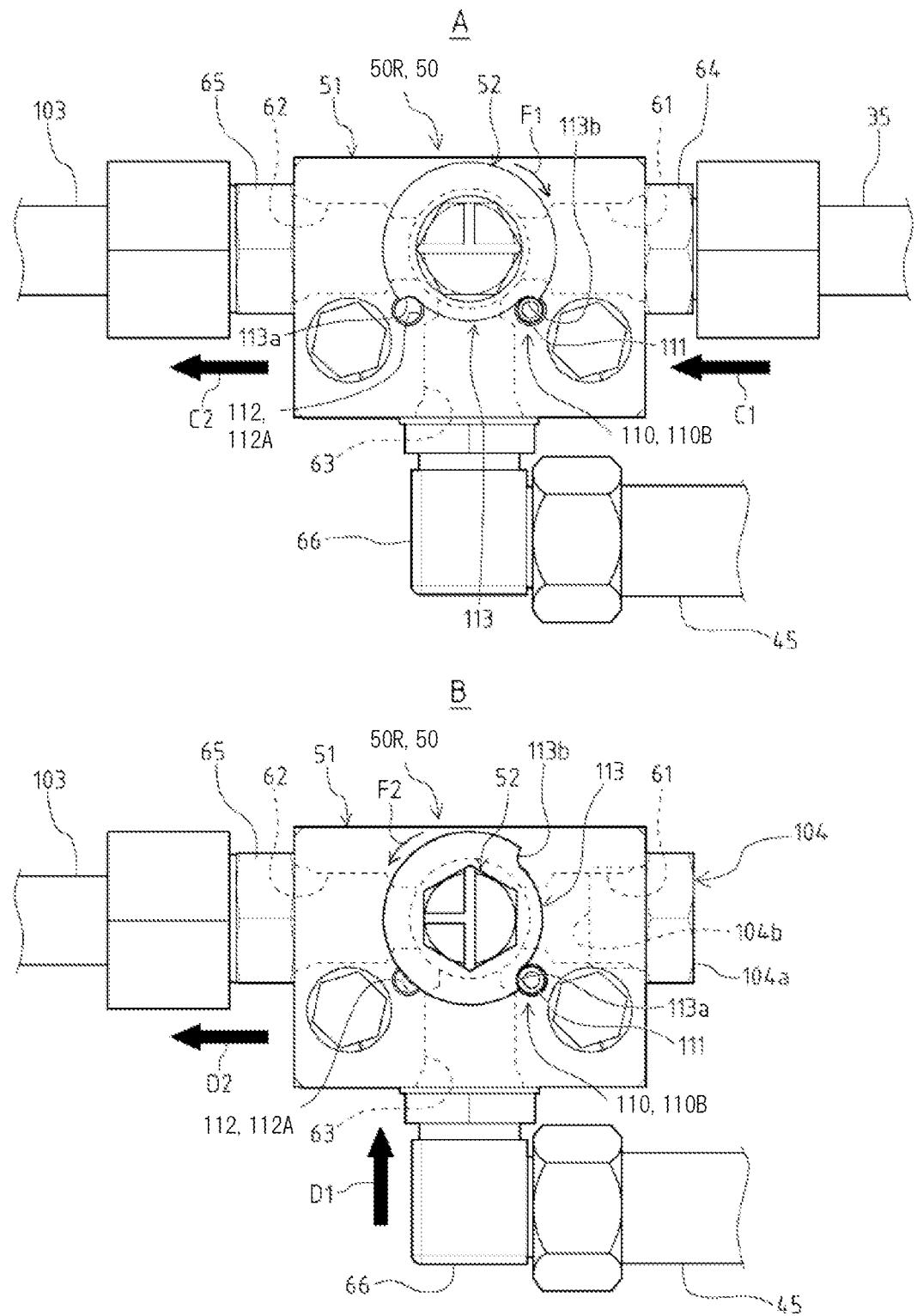
FIG. 17 shows one example of a connection mode of the hydraulic hose to a right flow path switching valve according to the one embodiment of the present invention.

The valve body 52 is an axial member having a substantially cylindrical outline as a whole, as shown in FIGS. 13 and 14, and has a communicating flow path 85 that selectively communicates the opening portions where the body 51 is present. The valve body 52 has a body shaft portion 81 which is a portion forming the communicating flow path 85, an actuator portion 82 which is the end portion on the front side of the valve body 52, and a protruding edge portion 83 which is a flange-like portion installed between the body shaft portion 81 and the actuator portion 82.

The body shaft portion 81 is a cylindrical part having an outer circumferential face 81a along the cylindrical face, making up the majority on the rear side of the valve body 52. The actuator portion 82 has a substantially hexagonal cylindrical shape similar to the head portion of a hexagonal bolt, and has a side portion 82a having six planar sides that form a hexagonal shape in the axial view of the valve body 52, and an end face portion 82b that forms the end face on the front side of the valve body 52. The protruding edge portion 83 is a part enlarged in diameter relative to the body shaft portion 81 and the actuator portion 82, and is a plate-like portion with the valve body 52's axial direction as a plate thickness direction. The protruding edge portion 83 has a substantially circular shape in the axial view of the valve body 52.

Being inserted into the valve body support hole 73, with the front-back direction as the axial direction, and penetrating the body 51 in the front-back direction, the valve body 52 is installed on the body 51 in a manner to be rotated around the central axis. The valve body 52 is equipped in a state that substantially the entirety of the body shaft portion 81 is positioned within the valve body support hole 73. The outer diameter of the body shaft portion 81 is substantially the same as the inner diameter of the valve body support hole 73 of the body 51; concerning the rotation of the valve body 52, the outer circumferential face 81a of the body shaft portion 81 serves as a face for sliding relative to the inner peripheral face of the valve body support hole 73.

Thus, the valve body 52 has the central axis thereof aligned with the central axis of the valve body support hole 73, and in a fixed position inserted into the valve body support hole 73, is installed on the body 51 in a manner to rotate with the central axis as a rotation axis. The valve body 52, depending on the rotation position thereof, changes the direction around the central axis.

The valve body 52 has the protruding edge portion 83 positioned on the front face 51a of the body 51, and has a rear face 83a of the protruding edge portion 83 in contact or substantially in contact with the front face 51a. Meanwhile, the valve body 52 has the rear end portion thereof protrude from the rear face 51b of the body 51, and has a "C" shaped retaining ring 75, as a member locking to the rear face 51b, fit over the rear end protruding portion thereof. The rear end portion of the body shaft portion 81 has an outer groove 81b for fitting the retaining ring 75.

Figure 12:
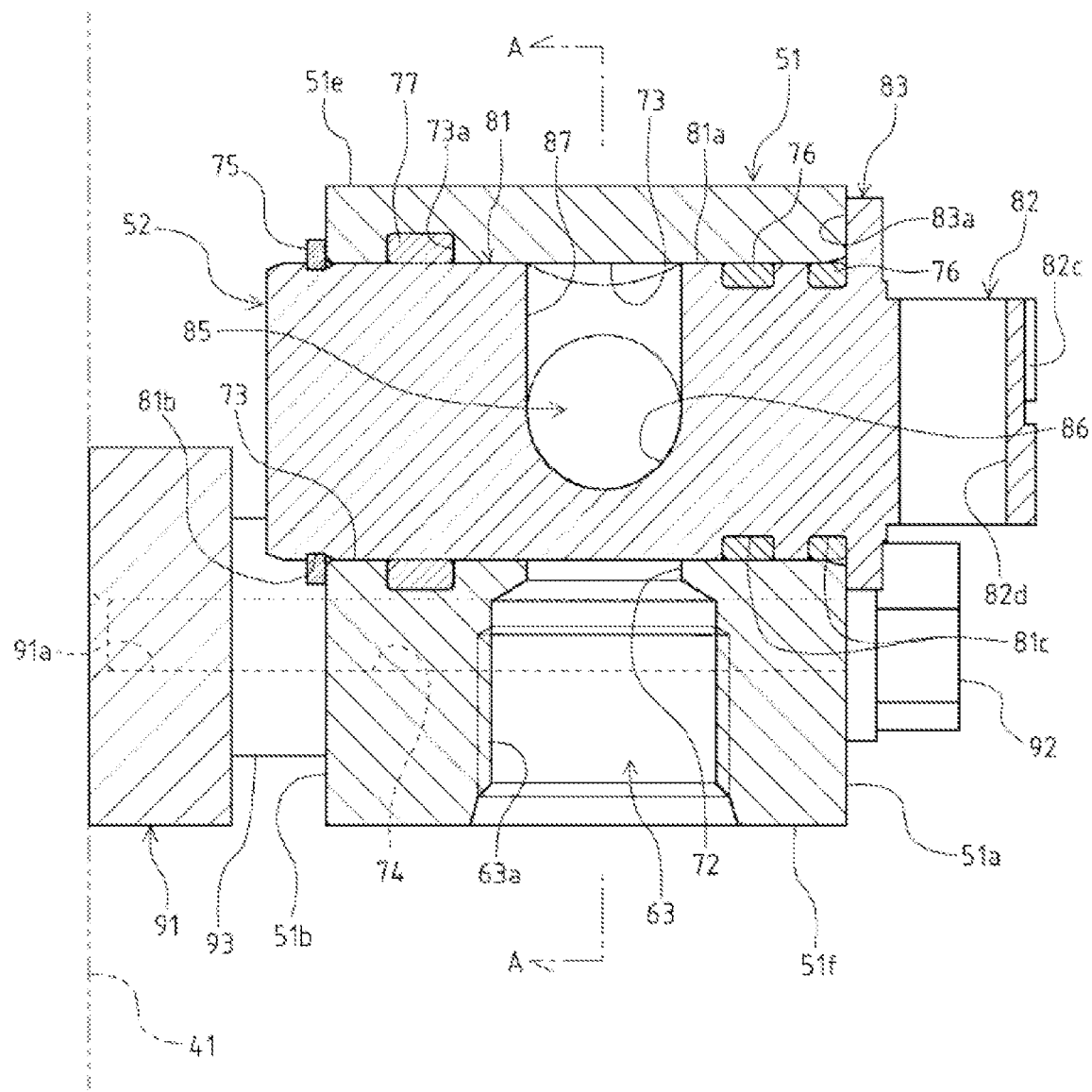
FIG. 12 is a cross-sectional view of B-B in FIG. 7.

Between the body shaft portion 81 of the valve body 52 and the body 51, a plurality of oil seals 76, 77 are interposed (see FIG. 12). For the body shaft portion 81's portion on the front side of the communicating flow path 85, two oil seals 76 are equipped that fit with two outer peripheral grooves 81c formed in the body shaft portion 81. For the body shaft portion 81's portion on the rear side of the communicating flow path 85, a single oil seal 77 is equipped that fits with an inner peripheral groove 73a formed in the site where the valve body support hole 73 is formed in the body 51.

To the body 51, the valve body 52 is rotatably supported at such a strength that the valve body 52 is not rotated by an action of the pressure oil passing through the communicating flow path 85. In the present embodiment; to the body 51, the valve body 52 is rotatably supported at such a strength that the valve body 52 cannot be easily rotated by a direct operation by a human hand.

Depending on the direction changed by the valve body 52's rotation position, that is, the valve body 52's rotation relative to the body 51, the communicating flow path 85 causes two of the three opening portions including the first opening portion 61, the second opening portion 62, and the third opening portion 63. The communicating flow path 85 is formed in the axial center portion of the body shaft portion 81 in a manner to correspond to the first oil path 71 and the second oil path 72 which are formed in the body 51.

The communicating flow path 85 has a first communicating flow path portion 86 penetrating along the radial direction of the body shaft portion 81, and a second communicating flow path portion 87 so formed from one side of the body shaft portion 81 in the radial direction as to merge with the first communicating flow path portion 86 in a direction orthogonal thereto. By the first communicating flow path portion 86 and the second communicating flow path portion 87, the communicating flow path 85 is formed lineally symmetrically along a "T" shape in the axial view of the body shaft portion 81.

In the valve body 52, the communicating flow path 85 is so formed that the respective central axes of the first communicating flow path portion 86 and the second communicating flow path portion 87 are positioned on a common plane perpendicular to the axial direction of the body shaft portion 81. The first and second communicating flow path portions 86 and 87 are formed along the cylindrical inner peripheral face and are the same or substantially the same in inner diameter (flow path diameter) as the first oil path 71 and the second oil path 72.

Figure 11:
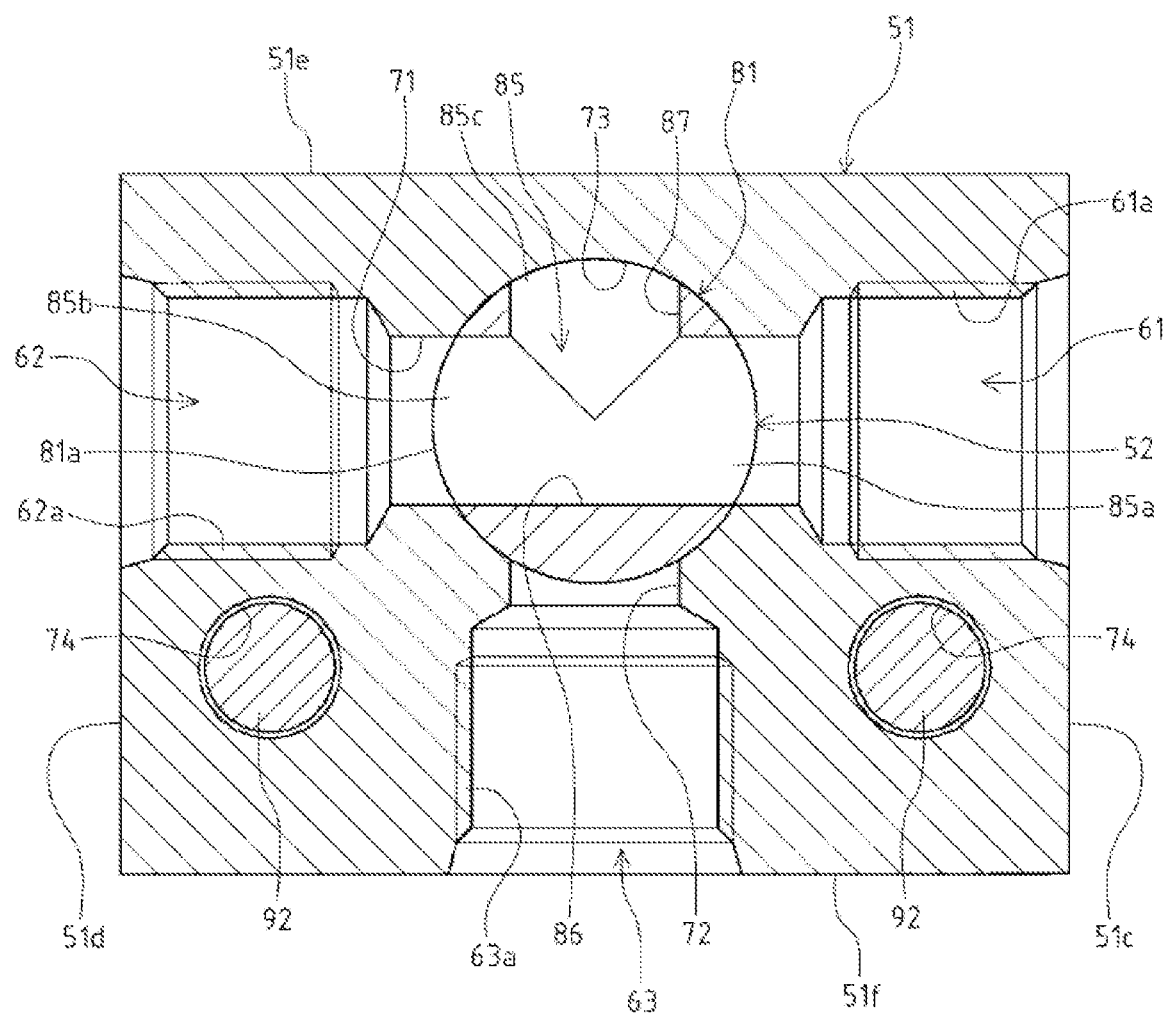
FIG. 11 is a cross-sectional view of A-A in FIG. 12.

The communicating flow path 85 is open at three locations for the outer circumferential face 81a of the body shaft portion 81. As shown in FIG. 11, in a state where the communicating flow path 85 is in an inverted "T" shape in the axial view of the body shaft portion 81, the opening portion positioned on the right side is defined as a first opening 85a, the opening portion positioned on the left side is defined as a second opening 85b, and the opening portion positioned on the top side is defined as a third opening 85c. The opening portions on both sides of the first communicating flow path portion 86 are the first opening 85a and the second opening 85b, and the opening portion of the second communicating flow path portion 87 is the third opening 85c.

In the above configuration, the rotation position of the valve body 52 that selectively communicates two of the three opening portions of the body 51 includes the following three.

That is, the first rotation position is, as shown in FIG. 11, is a rotation position where the valve body 52 turns the first opening 85a rightward, the second opening 85b leftward, and the third opening 85c upward. With the valve body 52 in the first rotation position, the first oil path 71 of the body 51 and the first communicating flow path portion 86 of the valve body 52 form a linear flow path continuous in the right/left direction, and the above flow path allows the first opening portion 61 and the second opening portion 62 to communicate with each other. When the valve body 52 is in the first rotation position, the third opening 85c is closed by the upper portion of the inner circumferential wall of the valve body support hole 73.

The second rotation position, as shown in FIG. 15A, is a rotation position where the valve body 52 has rotated 90° to the right (clockwise), in the front view, from the first rotation position. That is, the second rotation position is the rotation position where the valve body 52 turns the first opening 85a downward, the second opening 85b upward, and the third opening 85c rightward. With the valve body 52 in the second rotation position, the first oil path 71's portion on the first opening portion 61 side and the second oil path 72 in the body 51, and the second communicating flow path portion 87 and the first communicating flow path portion 86's portion on the first opening 85a side in the valve body 52 form a right-angled flow path that causes the first opening portion 61 and the third opening portion 63 to communicate with each other. When the valve body 52 is in the second rotation position, the second opening 85b is closed by the upper portion of the inner circumferential wall of the valve body support hole 73.

The third rotation position, as shown in FIG. 15B, is a rotation position where the valve body 52 has rotated 90° to the left (counterclockwise), in the front view, from the first rotation position. That is, the third rotation position is the rotation position where the valve body 52 turns the first opening 85a t upward, the second opening 85b downward, and the third opening 85c leftward. With the valve body 52 in the third rotation position, the first oil path 71's portion on the second opening portion 62 side and the second oil path 72 in the body 51, and the second communicating flow path portion 87 and the first communicating flow path portion 86's portion on the second opening 85b side in the valve body 52 form a right-angled flow path that causes the second opening portion 62 and the third opening portion 63 to communicate with each other. When the valve body 52 is in the third rotation position, the first opening 85a is closed by the upper portion of the inner circumferential wall of the valve body support hole 73.

The above rotation positions of the valve body 52 are switched by the rotating operation of the valve body 52. That is, the rotating operation of the valve body 52 switches the communication state between the opening portions, switching the flow path in the flow path switching valve 50.

In the valve body 52, a "T"-shaped groove portion 82c which corresponds to the flow path shape of the communicating flow path 85 is formed in the end face portion 82b of the actuator portion 82. That is, the groove portion 82c, corresponding to the "T" shape of the body shaft portion 81 in the axial view, has a linear portion along the first communicating flow path portion 86 and a linear portion along the second communicating flow path portion 87, forming a "T" shape. The groove portion 82c allows the rotation position of the valve body 52, i.e., the switching state of the flow path in the flow path switching valve 50 (communicating state), to be easily visible from the front side of the flow path switching valve 50.

The valve body 52 has the actuator portion 82 as a valve body protruding portion which is a portion protruding from the body 51 to the front side. The actuator portion 82 has a hole portion 82d passing through in a direction along a plane perpendicular to the rotation axis direction of the valve body 52.

The hole portion 82d is a linear through hole with a circular hole shape, and is formed along the diameter of the actuator portion 82. That is, the hole portion 82d is so formed that the central axis intersects the central axis of the valve body 52 and is along a plane perpendicular to the axial direction of the valve body 52. The hole portion 82d is opened on two planes positioned on opposite sides of the six planes of the side portion 82a.

At the time of turning the valve body 52, the hole portion 82d is used as an engaging portion to engage a tool or the like with the actuator portion 82. That is, a rod-shaped tool such as a screwdriver, for example, is used as an operating tool, and penetrating the tool through the hole portion 82d cause the operating tool to engage with the actuator portion 82. In such a state, the operating tool protruding on both sides from the hole portion 82d is used as a handle (actuator portion), rotating the valve body 52. Therefore, the hole portion 82d has a hole diameter that can be penetrated by a screwdriver or other commonly used tool.

The configuration of mounting the flow path switching valve 50 in the excavating unit 3 is described below. As described above, the flow path switching valve 50 is installed on the right and left sides 41 of the arm 18 included in the excavating unit 3. The flow path switching valve 50 is mounted at a substantially center position in the direction of extension of the arm 18 (right and left in FIGS. 3 and 4), in a forward inclined orientation in a manner to be forward-descending relative to the direction of extension. The right and left flow path switching valves 50 are each installed on the side 41 of the arm 18 in a similar manner.

As shown in FIGS. 7 and 12, the flow path switching valve 50 is mounted to the side 41 of the arm 18 via a support plate 91. The support plate 91 is a rectangular plate-shaped member, with the right/left direction as the longitudinal direction relative to the flow path switching valve 50, and has dimensions substantially the same as the rightward/leftward dimensions of the body 51 in the right/left direction. The support plate 91 has one-side plate face thereof in contact with the side 41 of the arm 18, and is fixed in place by welding or the like to the arm 18.

The flow path switching valve 50 is fixed to the support plate 91 by two fixing bolts 92 that pass through the body 51 in the front-back direction. In the body 51, fixing hole portions 74 for the fixing bolts 92 to pass through are formed in the front-back direction outside the third opening portion 63 on right and left and below the first opening portion 61 and second opening portion 62, respectively, i.e., at the lower portions on the right and left. The support plate 91 has threaded holes 91a, which are female thread portions, at positions corresponding to the right and left fixing hole portions 74.

In a fixed portion by the fixing bolt 92, a cylindrical spacer 93, through which the fixing bolt 92 passes, is interposed between the body 51 and the support plate 91. The fixing bolt 92 is inserted into the fixing hole portion 74 from the front side of the body 51, penetrates through the body 51 and spacer 93, and is screwed into the threaded hole 91a. The fixing bolt 92 secures the body 51 to the support plate 91, and the flow path switching valve 50 is mounted to side 41 of the arm 18 via the support plate 91.

The mounting configuration of the flow path switching valve 50 is not limited to the present embodiment. The flow path switching valve 50 may be mounted to the arm 18 by directly fixing the body 51 to the side 41 of the arm 18 by welding, bolting, or the like.

The following is a description of a mode in which the hydraulic hoses are connected to the right and left flow path switching valves 50 according to the present embodiment.

FIG. 16A shows a state of connecting the hydraulic hose to the left flow path switching valve 50L when the breaker 30 mounted, instead of the bucket 19, on the excavating unit 3 is used. FIG. 16B shows a state of connecting to the left flow path switching valve 50L when the bucket 19 mounted on the excavating unit 3 is used.

As shown in FIGS. 16A and 16B, regardless of whether the breaker is in use or the bucket is in use, in the left flow path switching valve 50L, one end side of a supply hose 101 is connected via the first coupling 64 to the first opening portion 61 positioned on the right side as a base end side of the arm 18. To the front of the traveling unit 2, the supply hose 101 extends from a control valve (not shown) installed on the turn stand 7, etc., in the traveling unit 2.

As shown in FIGS. 1 and 2, the supply hose 101 is placed from the front side of the traveling unit 2, along the boom 17, is extended along the left side 41a of the arm 18, and is connected to the first opening portion 61 of the left flow path switching valve 50L. On the left side 41a of the arm 18, a ring-shaped hose guide 95 for the supply hose 101 to pass through is equipped behind the left flow path switching valve 50L.

As shown in FIGS. 16A and 16B, regardless of whether the breaker is in use or the bucket is in use, in the left flow path switching valve 50L, the other end of the bottom-side hydraulic hose 44 having one end side connected to the thumb cylinder 29 is connected, via the third coupling 66, to the third opening portion 63 positioned on the bottom side. In the present embodiment, the third coupling 66 is an L-shaped coupling, extending the bottom-side hydraulic hose 44 from the left flow path switching valve 50L toward the tip side of the arm 18.

As shown in FIG. 16A, when the breaker is in use, the other end side of the supply breaker hose 34 having one end side connected to the breaker 30 is connected, via the second coupling 65, to the second opening portion 62 positioned on the left side of the left flow path switching valve 50L serving as the tip side of the arm 18 (see FIG. 5). As shown in FIG. 16A, when the breaker is in use, the valve body 52 is in the first rotation position (see FIG. 11).

As a result, in the left flow path switching valve 50L, the hydraulic oil supplied from the supply hose 101 flows in from the first opening portion 61 (see arrow A1), flows out from the second opening portion 62 through the first oil path 71 in a communication state via the first communicating flow path portion 86 (see arrow A2), and is supplied to the breaker 30 by the supply breaker hose 34. Thus, in the left flow path switching valve 50L with the breaker in use, the linear oil path that is formed when the valve body 52 is in the first rotation position and that is from the first opening portion 61 to the second opening portion 62 is used.

Meanwhile, as shown in FIG. 16B, when the bucket is in use, the second opening portion 62 of the left flow path switching valve 50L is not used. Due to this, the second opening portion 62 is closed by a closure member 102. The closure member 102 has, for example, a head portion 102*a* with a substantially hexagonal shape and a threaded portion 102*b*, and like the second coupling 65, is screw-fastened to the second opening portion 62 via an oil seal or the like. And, as shown in FIG. 16B, when the bucket is in use, the valve body 52 is in the second rotation position (see FIG. 15A).

As a result, in the left flow path switching valve 50L, the hydraulic oil supplied from the supply hose 101 flows in from the first opening portion 61 (see arrow B1), flows out from the third opening portion 63 via the right portion of the first oil path 71, the second communicating flow path portion 87, the first communicating flow path portion 86's portion on the first opening 85*a* side, and the second oil path 72 (see arrow B2), and is supplied to the thumb cylinder 29 by the bottom-side hydraulic hose 44. Thus, in the left flow path switching valve 50L, the bent (right-angled) oil path that is formed when the valve body 52 is in the second rotation position and that is from the first opening portion 61 to the third opening portion 63 is used.

FIG. 17A shows a state of connecting the hydraulic hose to the right flow path switching valve 50R when the breaker is in use. FIG. 17B shows a state of connecting to the right flow path switching valve 50R when the bucket is in use.

As shown in FIGS. 17A and 17B, regardless of whether the breaker is in use or the bucket is in use, in the right flow path switching valve 50R, one end side of a discharge hose 103 is connected via the second coupling 65 to the second opening portion 62 positioned on the left side as a base end portion of the arm 18. The other end of the discharge hose 103 is connected to an oil tank (not shown) equipped in the traveling unit 2. That is, the discharge hose 103 is a return pipe to the oil tank, and the hydraulic oil in the oil tank is supplied via a control valve or the like to the supply hose 101.

Figure 4:
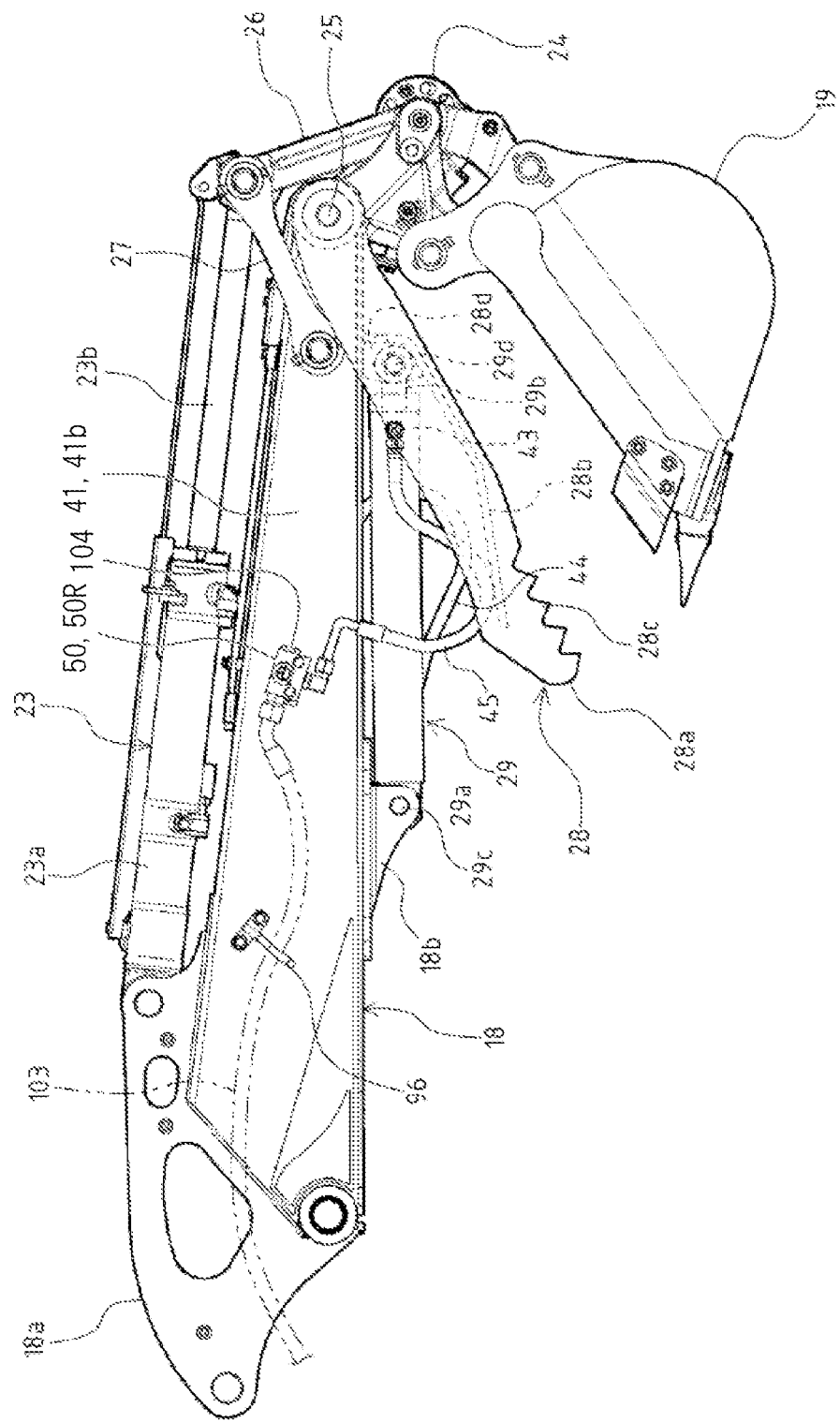
FIG. 4 is a right side view of a part of the excavating unit according to the one embodiment of the present invention.

The discharge hose 103 is placed along the boom 17 from the front side of the traveling unit 2, is extended along the right side 41*b* of the arm 18, and is connected to the second opening portion 62 of the right flow path switching valve 50R (see FIG. 4). On the right side 41*b* of the arm 18, a ring-shaped hose guide 96 for the discharge hose 103 to pass through is equipped at the position behind the right flow path switching valve 50R.

Also, as shown in FIGS. 17A and 17B, regardless of whether the breaker is in use or the bucket is in use, in the right flow path switching valve 50R, the other end of the rod-side hydraulic hose 45 having one end connected to the thumb cylinder 29 is connected, via the third coupling 66, to the third opening portion 63 positioned on the bottom side.

In the present embodiment, the third coupling 66 is an L-shaped coupling, extending the rod-side hydraulic hose 45 from the right flow path switching valve 50R toward the tip side of the arm 18.

As shown in FIG. 17A, when the breaker is in use, the other end side of the discharge breaker hose 35 having one end side connected to the breaker 30 is connected, via the first coupling 64, to the first opening portion 61 positioned on the front side of the right flow path switching valve 50R (see FIG. 5). As shown in FIG. 17A, when the breaker is in use, the valve body 52 is in the first rotation position (see FIG. 11).

As a result, in the right flow path switching valve 50R, the hydraulic oil discharged from the breaker 30 flows in from the first opening portion 61 (see arrow C1), flows out from the second opening portion 62 through the first oil path 71 in a communication state via the first communicating flow path portion 86 (see arrow C2), and is returned to the oil tank by the discharge hose 103. Thus, in the right flow path switching valve 50R with the breaker in use, the linear oil path that is formed when the valve body 52 is in the first rotation position and that is from the first opening portion 61 to the second opening portion 62 is used.

Meanwhile, as shown in FIG. 17B, when the bucket is in use, the first opening portion 61 of the right flow path switching valve 50R is not used. Due to this, the first opening portion 61 is closed via an oil seal or the like by a closure member 104 having a head portion 104*a* and a threaded portion 104*b*, like the closure member 102. And, as shown in FIG. 17B, when the bucket is in use, the valve body 52 is in the third rotation position (see FIG. 15B).

As a result, in the right flow path switching valve 50R, the hydraulic oil discharged from the rod-side hydraulic hose 45 flows in from the third opening portion 63 (see arrow D1), flows out from the second opening portion 62 via the second oil path 72, the first communicating flow path portion 86's portion on the second opening 85*b* side, the second communicating flow path portion 87, and the left side portion of the first oil path 71 (see arrow D2), and is returned to the oil tank by the discharge hose 103. Thus, in the right flow path switching valve 50R, the bent (right-angled) oil path that is formed when the valve body 52 is in the third rotation position and that is from the third opening portion 63 to the second opening portion 62 is used.

As described above, with the flow path switching valve 50, the bottom-side hydraulic hose 44 and the rod-side hydraulic hose 45, which are connected to the third opening portion 63, are left connected to the thumb cylinder 29, while the other opening portions are used as opening portions to connect hydraulic hoses to operate the breaker 30.

Depending on whether the breaker or the bucket is in use, the flow paths of the right and left flow path switching valves 50 are switched by the rotating operation of the valve body 52. That is, concerning the left flow path switching valve 50L; when the breaker is in use, the valve body 52 is in the first rotation position, and when the bucket is in use, the valve body 52 is in the second rotation position. Meanwhile, concerning the right flow path switching valve 50R; when the breaker is in use, the valve body 52 is in the first rotation position, and when the bucket is in use, the valve body 52 is in the third rotation position.

Thus, in the present embodiment, the left flow path switching valve 50L serves as the first flow path switching valve which receives the connection of the supply hose 101 that is extended, to the first opening portion 61, from the traveling unit 2 side, and that is the supply oil pipe for supplying the hydraulic oil to the thumb cylinder 29 for driving the thumb 28 or to the breaker 30. In addition, the right flow path switching valve 50R serves as the second flow path switching valve which receives the connection of the discharge hose 103 that is extended, to the second opening portion 62, from the traveling unit 2 side, and that is the discharge oil pipe for returning the hydraulic oil discharged from the thumb cylinder 29 or from the breaker 30.

Regarding the rotating operation of the valve body 52, the flow path switching valve 50 has a selecting portion for selecting the rotation position of the valve body 52 by regulating the rotation range of the valve body 52.

In the left flow path switching valve 50L, the selecting portion regulates the rotation range of the valve body 52 to be within an angular range of substantially 90° from the first rotation position seen when the breaker is in use (see FIG. 16A) to the second rotation position seen when the bucket is in use (see FIG. 16B). In the right flow path switching valve 50R, the selecting portion regulates the rotation range of the valve body 52 to be within an angular range of substantially 90° from the first rotation position seen when the breaker is in use (see FIG. 17A) to the third rotation position seen when the bucket is in use (see FIG. 17B).

The flow path switching valve 50 has, as the selecting portion, a locking protrusion portion 110 that protrudes from the front face 51*a* of the body 51 and engages with the valve body 52 thereby to regulate the rotation of the valve body 52. The locking protrusion portion 110 is a protruding portion having a cylindrical outline with the front-back direction as the central axis direction, and when contacting the valve body 52, functions as a stopper to stop the rotation of the valve body 52 at a predetermined position. Thus, regarding the rotating operation of the valve body 52, the selecting portion of the flow path switching valve 50 functions as a valve body positioning portion that regulates the rotation range of the valve body 52 thereby to position the rotation position of the valve body 52.

In the present embodiment, the locking protrusion portion 110 is equipped by mounting, to the body 51, a lock pin 111 as a rotation regulating member which is a member detachably mounted to the body 51. The lock pin 111 is linear pipe member that is short (e.g., about ¼) relative to the length of the body 51 in the front-back direction (see FIG. 9).

The body 51 has a support hole portion 112 that serves as a portion for mounting the lock pin 111 and that is open facing the front face 51*a*. The support hole portion 112 is a cylindrical hole corresponding to the outer shape of the lock pin 111, and, for the lock pin 111 to be inserted, has an inner diameter (hole diameter) substantially the same as an outer diameter of the lock pin 111. The support hole portion 112 has a depth equivalent to the length of a substantially half of the lock pin 111, and substantially half the lock pin 111 protrudes from the front face 51*a*.

The support hole portion 112 holds the inserted lock pin 111 at such a strength as to prevent the inserted lock pin 111 from being removed by the operation of the excavating unit 3 or by the traveling of the traveling unit 2. The body 51 has, as the support hole portion 112, a left support hole portion 112A as a first mounting portion used in the left flow path switching valve 50L, and a right support hole portion 112B as a second mounting portion used in the right flow path switching valve 50R.

In this way, inserting the lock pin 111 into the support hole portion 112 engages the protruding edge portion 83 with the locking protrusion portion 110 installed on the body 51, causing the valve body 52 to receive the regulation of the rotating. The protruding edge portion 83 has a locking recessed portion 113 as a portion that receives the engaging of the locking protrusion portion 110.

The locking recessed portion 113 is a notch-shaped portion formed in an arc along the circumferential direction of the protruding edge portion 83 at the peripheral edge portion of the protruding edge portion 83. The locking recessed portion 113 is formed across a substantially 90° angle range, corresponding to the rotation range of the valve body 52 regulated as described above. At both end portions of the locking recessed portion 113, there are formed locking portions 113*a*, 113*b* which are portions engaged with the locking protrusion portion 110. The locking portions 113*a*, 113*b* are formed as arc-shaped recessed portions corresponding to the frontal view outline of the locking protrusion portion 110.

To the above protruding edge portion 83, the locking protrusion portion 110 is equipped so that at least a portion thereof is positioned within the circular range along which the outer circumference of the protruding edge portion 83 extends. The valve body 52 positions the locking protrusion portion 110 at the site where the locking recessed portion 113 is formed, thereby making it possible to rotate the protruding edge portion 83 without interfering with the locking protrusion portion 110, due to the locking recessed portion 113. Then, the valve body 52, with the locking portions 113*a*, 113*b* caused to contact the locking protrusion portion 110, is locked to the locking protrusion portion 110, and the rotation is regulated.

In the valve body 52 in the first rotation position, the locking recessed portion 113 is formed symmetrically at the lower site of the protruding edge portion 83. With the valve body 52 in the first rotation position, the left support hole portion 112A and the right support hole portion 112B are formed at positions that correspond to the left and right locking portions 113*a*, 113*b*. That is, with the valve body 52 in the first rotation position; in the front view, the left and right locking portions 113*a*, 113*b* have their arc-shaped concave shapes along the circular support hole portion 112.

With the above configuration, in the left flow path switching valve 50L, the lock pin 111 is inserted into the left support hole portion 112A, providing a left locking protrusion portion 110A as the locking protrusion portion 110. With the left locking protrusion portion 110A, as shown in FIG. 16A, causing the locking portion 113*a* on one side (left side in FIG. 16A) to contact and engage with the left locking protrusion portion 110A regulates the counterclockwise rotation (see arrow E1) from the state of being in the first rotation position, positioning the valve body 52 relative to the first rotation position.

Also, with the left locking protrusion portion 110A, as shown in FIG. 16B, causing the locking portion 113*b* on the other side (bottom side in FIG. 16B) to contact and engage with the left locking protrusion portion 110A regulates the clockwise rotation (see arrow E2) from the state of being in the second rotation position, positioning the valve body 52 relative to the second rotation position.

Thus, in the left flow path switching valve 50L, the left locking protrusion portion 110A serves as the selecting portion that regulates the rotation range of the valve body 52 in a substantially 90° range between the first and second rotation positions, thereby to select the rotation position of the valve body 52 as any of the first rotation position and the second rotation position.

Here, the first rotation position is the rotation position where the opening portions including the first opening portion 61 and the second opening portion 62, as a first combination of combinations the two-opening portions selected from the three opening portions of the body 51, are communicated with each other by the communicating flow path 85. The second rotation position is the rotation position where the opening portions including the first opening portion 61 and the third opening portion 63, as a second combination different from the first combination, are communicated by the communicating flow path 85. Thus, the left support hole portion 112A, which constitutes the left locking protrusion portion 110A by accepting the lock pin 111, causes the first combination, for the opening portions, to include the first opening portion 61 and the second opening portion 62, and causes the second combination to include the first opening portion 61 and the third opening portion 63.

Meanwhile, in the right flow path switching valve 50R, the lock pin 111 is inserted into the right support hole portion 112B, providing a right locking protrusion portion 110B as the locking protrusion portion 110. With the right locking protrusion portion 110B, as shown in FIG. 17A, causing the locking portion 113*b* on one side (right side in FIG. 17A) to contact and engage with the right locking protrusion portion 110B regulates the clockwise rotation (see arrow F1) from the state of being in the first rotation position, positioning the valve body 52 relative to the first rotation position.

Also, with the right locking protrusion portion 110B, as shown in FIG. 17B, bringing the locking portion 113*a* on the other side (bottom side in FIG. 17B) to contact and engage with the right locking protrusion portion 110B regulates the counterclockwise rotation (see arrow F2) from the state of being in the third rotation position, positioning the valve body 52 relative to the third rotation position.

Thus, in the right flow path switching valve 50R, the right locking protrusion portion 110B serves as the selecting portion that regulates the rotation range of the valve body 52 in a substantially 90° range between the first and third rotation positions, thereby to select the rotation position of the valve body 52 as any of the first rotation position and the third rotation position.

Here, the first rotation position is, like the case of the left flow path switching valve 50L, the rotation position where the opening portions including the first opening portion 61 and the second opening portion 62 as the first combination are communicated with each other by the communicating flow path 85. The third rotation position is the rotation position where the opening portions including the second opening portion 62 and the third opening portion 63, as a second combination different from the first combination, are communicated by the communicating flow path 85. Thus, the right support hole portion 112B, which constitutes the right locking protrusion portion 110B by accepting the lock pin 111, causes the first combination, for the opening portions, to include the first opening portion 61 and the second opening portion 62, and causes the second combination to include the second opening portion 62 and the third opening portion 63.

The flow path switching valve 50 according to the present embodiment having the above configuration facilitates the formation of the flow path to the body 51, can be manufactured at a low cost, and is able to be made compact.

That is, in the flow path switching valve 50, the flow path of the body 51 is so formed as to be along the "T" shape by the first oil path 71 and the second oil path 72 each being a linear flow path, making it possible to easily form the flow path. This will reduce the cost for forming the flow path.

The three opening portions of the body 51 are formed in a manner to be distributed to three sides including the right/left sides and bottom side of the body 51. Since one opening portion is formed on one face of the body 51, this allows the body 51 to be compact, compared to a configuration with two opening portions formed on one face of the body 51, for example.

With the flow path switching valve 50 according to the present embodiment, the symmetrical flow path can be configured, with a simple configuration, by the rotating operation of the valve body 52. Therefore, the bucket 19 and the breaker 30 can be separately used with ease by switching the flow path with the flow path switching valve 50.

In the flow path switching valve 50 according to the present embodiment, the locking protrusion portion 110 for positioning the valve body 52 is installed on the body 51 by inserting the detachable lock pin 111 into the support hole portion 112. The body 51 has, as a portion for inserting the lock pin 111, the left support hole portion 112A used in the left flow path switching valve 50L, and the right support hole portion 112B used in the right flow path switching valve 50R.

With the above configuration, depending on the mode of switching the flow path in the flow path switching valve 50, replacing of the lock pin 111 can easily change the position for installing the locking protrusion portion 110. When the flow paths to be switched are to be limited in different modes in the right and left flow path switching valves 50 by regulating the rotation of the valve body 52; depending on the position for mounting the lock pin 111, the flow paths to be switched can be easily changed.

In particular, with the flow path switching valve 50 according to the present embodiment, replacing the lock pins 111 for the two support hole portions 112 can reverse the flow path on right and left in the right and left flow path switching valves 50, making it possible to accomplish a symmetrical flow path switching configuration, including the mode of regulating the rotation of the valve body 52.

Thus, by merely changing the insertion position of the lock pin 111, the flow path switching valve 50 according to the present embodiment can be used either the left flow path switching valve 50L or the right flow path switching valve 50R. Therefore, all of the components themselves of the right and left flow path switching valves 50 can be common. This allows for lower costs and easier management of parts. In addition, regarding the mounting of the right and left flow path switching valves 50, it is not necessary to flip the body 51 upside down at the right and left flow path switching valves 50, for example, and mounting the right and left flow path switching valves 50 in the same mode on both sides can obtain a flow path configuration reversed on right and left, thus making it possible to eliminate any error in mounting the right and left flow path switching valves 50.

In the flow path switching valve 50 according to the present embodiment, the hole portion 82*d* is formed at the actuator portion 82 as the valve body 52's portion protruding from the body 51.

With the above configuration, causing a rod-shaped matter such as a screwdriver having a certain rigidity to pass through the hole portion 82*d* can easily rotate, without using a dedicated tool, the valve body 52 for the switching of the flow path. For the outer shape of the hexagonal column-shaped actuator portion 82, using a spanner, wrench, or other tool can naturally rotate the valve body 52.

Also, the excavating work machine 1 according to the present embodiment has, as the flow path switching valve 50, the left flow path switching valve 50L installed on the oil path for supplying the hydraulic oil to the thumb cylinder 29 or the breaker 30, and the right flow path switching valve 50R installed on the oil path for discharging the hydraulic oil from the thumb cylinder 29 or the breaker 30.

With the above configuration, a simple, inexpensive, and compact configuration can be achieved for the flow path switching valves 50 to be installed on both the right and left sides of the arm 18 of the excavating unit 3. And, the flow path switching valve 50 according to the present embodiment is preferably used in the excavating work machine 1 that has the thumb 28 in the excavating unit 3 and replaces the bucket 19 and the breaker 30 depending on the nature of work at the site.

The flow path switching valve and construction machine according to the present invention described above are not limited to the embodiment described above, and various modes can be adopted to the extent according to the gist of the present invention.

In the embodiment described above, the flow path switching valve 50 is mounted on the side 41 of the arm 18, but the position of placing the flow path switching valve 50 is not limited. The position of placing the flow path switching valve 50 may be, for example, on the back face or ventral face of the arm 18, or on the left or right side of the boom 17.

In the embodiment described above, the left flow path switching valve 50L is the first flow path switching valve that receives the connection of the supply hose 101 at the first opening portion 61, and the right flow path switching valve 50R is the second flow control valve that receives the connection of the discharge hose 103 at the second opening portion 62, but the above flow path switching valves 50 may be placed opposite on right and left. That is, it may be so configured that the right flow path switching valve 50R is the first flow path switching valve, and the left flow path switching valve 50L is the second flow path switching valve.

In the embodiment described above, the rotation regulating member included in the locking protrusion portion 110 is the lock pin 111 inserted into the support hole portion 112, but the rotation regulating member may be, for example, a bolt-like member that is screw-fastened to the body. In this case, the bolt-like member is screwed into the threaded hole formed in the body 51 thereby to provide the locking protrusion portion 110.

DESCRIPTION OF REFERENCE NUMERALS

1: excavating work machine (construction machine)
2: traveling unit
3: excavating unit (front work unit)
17: boom
18: arm
19: bucket
28: thumb
29: thumb cylinder
30: breaker
41: side
41a: left side
41b: right side
50: flow path switching valve
50L: left flow path switching valve (first flow path switching valve)
50R: right flow path switching valve (second flow path switching valve)
51: body
51a: front face
51c: right face
51d: left face
51f: bottom face
52: valve body
61: first opening portion
62: second opening portion
63: third opening portion
71: first oil path
72: second oil path
82: actuator portion (valve body protruding portion)
82d: hole portion
83: protruding edge portion
85: communicating flow path
101: supply hose
103: discharge hose
110: locking protrusion portion
111: lock pin (rotation regulating member)
112: support hole portion (mounting portion)
112A: left support hole portion (first mounting portion)
112B: right support hole portion (second mounting portion)

The invention claimed is:

1. A flow path switching valve for switching a flow path, the flow path switching valve comprising:
   a block-shaped body having:
      a first opening portion and a second opening portion which open on faces which are opposite to each other and are configured to communicate with each other via a linear first oil path, and
      a third opening portion opening which opens on a face different from the faces which are opposite to each other and is configured to communicate via a linear second oil path to the first oil path;
   a valve body that is rotatably installed on the block-shaped body, and that is formed with a communicating flow path which is configured to communicate, depending on a rotation position, two of the three opening portions with each other, wherein the three opening portions including the first opening portion, the second opening portion, and the third opening portion; and
   a selecting portion that is configured to, based on regulation of a rotation range of the valve body, select the rotation position of the valve body as:
      a rotation position where a first pair of two opening portions of a first combination of combinations of the two opening portions selected from the three opening portions communicate with each other by the communicating flow path, or
      a rotation position where a second pair of two opening portions of a second combination that is the combination different from the first combination communicate with each other by the communicating flow path, and
   wherein the selecting portion is configured to change the rotation range of the valve body to be regulated.

2. The flow path switching valve as claimed in claim 1, wherein:
   the selecting portion is equipped by mounting a rotation regulating member, which is a member detachably attached to the block-shaped body, on the block-shaped body, and
   the block-shaped body has, as mounting portions of the rotation regulating member:
      a first mounting portion configured to cause the first combination to include the first opening portion and the second opening portion, and cause the second combination to include the first opening portion and the third opening portion, and
      a second mounting portion configured to cause the first combination to include the first opening portion and the second opening portion, and cause the second combination to include the second opening portion and the third opening portion.

3. The flow path switching valve as claimed in claim 1, wherein:
the valve body has a valve body protruding portion which is a portion protruding from the block-shaped body, and
the valve body protruding portion is formed with a hole portion passing through in a direction along a plane perpendicular to a rotation axis direction of the valve body.

4. A construction machine equipped with the flow path switching valve as claim in claim 1, the construction machine comprising:
a traveling unit;
a front work unit that is installed in front of the traveling unit and that includes an arm portion by which a work attachment is detachably supported; and
a hydraulic driving unit that is provided on the arm portion and is configured to operate based on a supply of a hydraulic oil,
wherein the construction machine, as the flow path switching valve, includes:
a first flow path switching valve which is mounted to one of right and left sides of the arm portion, and which is configured to receive a connection of a supply oil pipe that is extended, to the first opening portion, from the traveling unit side, and that is configured to supply the hydraulic oil to the hydraulic driving unit or to the attachment, and
a second flow path switching valve which is mounted to another of right and left sides of the arm portion, and which is configured to receive a connection of a discharge oil pipe that is extended, to the second opening portion, from the traveling unit side, and that is configured to return the hydraulic oil discharged from the hydraulic driving unit or from the attachment.

5. A flow path switching valve for switching a flow path, the flow path switching valve comprising:
a block-shaped body having:
a first opening portion and a second opening portion which open on faces which are opposite to each other and are configured to communicate with each other via a linear first oil path, and
a third opening portion opening which opens on a face different from the faces which are opposite to each other and is configured to communicate via a linear second oil path to the first oil path;
a valve body that is rotatably installed on the block-shaped body, and that is formed with a communicating flow path which is configured to communicate, depending on a rotation position, two of the three opening portions with each other, wherein the three opening portions including the first opening portion, the second opening portion, and the third opening portion; and
a selecting portion that is configured to, based on regulation of a rotation range of the valve body, select the rotation position of the valve body as:
a rotation position where a first pair of two opening portions of a first combination of combinations of the two opening portions selected from the three opening portions communicate with each other by the communicating flow path, or
a rotation position where a second pair of two opening portions of a second combination that is the combination different from the first combination communicate with each other by the communicating flow path, and
wherein the selecting portion is equipped by mounting a rotation regulating member, which is a member detachably attached to the block-shaped body, on the block-shaped body.

6. The flow path switching valve as claimed in claim 5, wherein:
the block-shaped body has, as mounting portions of the rotation regulating member:
a first mounting portion, and
a second mounting portion.

7. The flow path switching valve as claimed in claim 6, wherein:
the first mounting portion is configured to cause the first combination to include the first opening portion and the second opening portion.

8. The flow path switching valve as claimed in claim 7, wherein:
the first mounting portion is configured to cause the second combination to include the first opening portion and the third opening portion.

9. The flow path switching valve as claimed in claim 8, wherein:
the second mounting portion is configured to cause the first combination to include the first opening portion and the second opening portion, and cause the second combination to include the second opening portion and the third opening portion.

10. The flow path switching valve as claimed in claim 9, wherein:
the second mounting portion is configured to cause the second combination to include the second opening portion and the third opening portion.

11. A construction machine comprising:
a flow path switching valve comprising:
a block-shaped body having:
a first opening portion and a second opening portion which open on faces which are opposite to each other and are configured to communicate with each other via a linear first oil path, and
a third opening portion opening which opens on a face different from the faces which are opposite to each other and is configured to communicate via a linear second oil path to the first oil path;
a valve body that is rotatably installed on the block-shaped body, and that is formed with a communicating flow path which is configured to communicate, depending on a rotation position, two of the three opening portions with each other, wherein the three opening portions including the first opening portion, the second opening portion, and the third opening portion; and
a selecting portion that is configured to, based on regulation of a rotation range of the valve body, select the rotation position of the valve body as:
a rotation position where a first pair of two opening portions of a first combination of combinations of the two opening portions selected from the three opening portions communicate with each other by the communicating flow path, or
a rotation position where a second pair of two opening portions of a second combination that is the combination different from the first combination communicate with each other by the communicating flow path, and wherein the selecting portion is equipped by mounting a rotation regulating member, which is a member detachably attached to the block-shaped body, on the block-shaped body;
a traveling unit;
a front work unit that is installed in front of the traveling unit and that includes an arm portion by which a work attachment is detachably supported; and
a hydraulic driving unit that is provided on the arm portion and is configured to operate based on a supply of a hydraulic oil,
wherein the construction machine, as the flow path switching valve, includes:
   a first flow path switching valve which is mounted to one of right and left sides of the arm portion, and which is configured to receive a connection of a supply oil pipe that is extended, to the first opening portion, from the traveling unit side, and that is configured to supply the hydraulic oil to the hydraulic driving unit or to the attachment, and
   a second flow path switching valve which is mounted to another of right and left sides of the arm portion, and which is configured to receive a connection of a discharge oil pipe that is extended, to the second opening portion, from the traveling unit side, and that is configured to return the hydraulic oil discharged from the hydraulic driving unit or from the attachment.

12. The construction machine as claimed in claim 11, wherein:
   the selecting portion is equipped by mounting a rotation regulating member, which is a member detachably attached to the block-shaped body, on the block-shaped body, and
   the block-shaped body has, as mounting portions of the rotation regulating member:
      a first mounting portion configured to cause the first combination to include the first opening portion and the second opening portion, and cause the second combination to include the first opening portion and the third opening portion, and
      a second mounting portion configured to cause the first combination to include the first opening portion and the second opening portion, and cause the second combination to include the second opening portion and the third opening portion.

13. The construction machine as claimed in claim 11, wherein:
   the valve body has a valve body protruding portion which is a portion protruding from the block-shaped body, and
   the valve body protruding portion is formed with a hole portion passing through in a direction along a plane perpendicular to a rotation axis direction of the valve body.

* * * * *